(12) United States Patent
Wanunu et al.

(10) Patent No.: US 11,547,972 B2
(45) Date of Patent: Jan. 10, 2023

(54) POROUS MEMBRANES COMPRISING NANOSHEETS AND FABRICATION THEREOF

(71) Applicant: Northeastern University, Boston, MA (US)

(72) Inventors: Meni Wanunu, Needham, MA (US); Bedanga Sapkota, Roslindale, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 16/044,353

(22) Filed: Jul. 24, 2018

(65) Prior Publication Data

US 2019/0039028 A1    Feb. 7, 2019

Related U.S. Application Data

(60) Provisional application No. 62/536,228, filed on Jul. 24, 2017, provisional application No. 62/573,262, filed on Oct. 17, 2017.

(51) Int. Cl.
*B01D 71/02* (2006.01)
*C02F 1/44* (2006.01)
(Continued)

(52) U.S. Cl.
CPC ......... *B01D 71/02* (2013.01); *B01D 67/0041* (2013.01); *B01D 67/0046* (2013.01);
(Continued)

(58) Field of Classification Search
CPC ...... B01D 71/02; B01D 69/144; B01D 69/02; B01D 67/004; B01D 67/0088;
(Continued)

(56) References Cited

U.S. PATENT DOCUMENTS

2004/0011651 A1    1/2004   Becker et al.
2010/0065726 A1    3/2010   Zhong et al.
(Continued)

FOREIGN PATENT DOCUMENTS

WO    WO-2017174987 A1 *  10/2017   ......... B01D 67/0046

OTHER PUBLICATIONS

Amino Acid reference chart Sigma Aldrich http://www.sigmaaldrich.com/life-science/metabolomics/learning-center/amino-acid-reference-chart.html (Year: 2009).*

(Continued)

*Primary Examiner* — Liam Royce
(74) *Attorney, Agent, or Firm* — Verrill Dana, LLP

(57)    ABSTRACT

A porous membrane comprising stacked layers of nanosheets, each nanosheet comprising one to three atomic layers of a 2D material comprising or consisting of one or more transition metal dichalcogenides is provided. The nanosheets have pores and the membrane comprises a network of water permeation pathways including through-pathways formed by the pores, horizontal pathways formed by gaps between the layers, and vertical pathways formed by gaps between adjacent nanosheets and stacking defects between the layers. Also provided is a method for making the membrane.

9 Claims, 10 Drawing Sheets

A

B

(51) Int. Cl.

| | | |
|---|---|---|
| *B01D 69/02* | (2006.01) | |
| *C01G 39/06* | (2006.01) | |
| *B01D 67/00* | (2006.01) | |
| *C01B 17/20* | (2006.01) | |
| *C01B 19/00* | (2006.01) | |
| *B01D 69/14* | (2006.01) | |
| *B82Y 40/00* | (2011.01) | |
| *C02F 103/08* | (2006.01) | |
| *C02F 101/30* | (2006.01) | |
| *C02F 101/12* | (2006.01) | |
| *B82Y 30/00* | (2011.01) | |
| *B01D 61/02* | (2006.01) | |
| *B01D 61/00* | (2006.01) | |

(52) U.S. Cl.
CPC ......... *B01D 67/0088* (2013.01); *B01D 69/02* (2013.01); *B01D 69/144* (2013.01); *C01B 17/20* (2013.01); *C01B 19/007* (2013.01); *C01G 39/06* (2013.01); *C02F 1/441* (2013.01); *C02F 1/445* (2013.01); *B01D 61/002* (2013.01); *B01D 61/025* (2013.01); *B01D 2323/04* (2013.01); *B01D 2323/36* (2013.01); *B01D 2325/20* (2013.01); *B01D 2325/38* (2013.01); *B82Y 30/00* (2013.01); *B82Y 40/00* (2013.01); *C01P 2002/78* (2013.01); *C01P 2002/82* (2013.01); *C01P 2002/84* (2013.01); *C01P 2004/02* (2013.01); *C01P 2004/03* (2013.01); *C01P 2004/04* (2013.01); *C01P 2004/20* (2013.01); *C01P 2004/24* (2013.01); *C01P 2004/62* (2013.01); *C01P 2004/64* (2013.01); *C01P 2006/16* (2013.01); *C01P 2006/22* (2013.01); *C02F 2101/12* (2013.01); *C02F 2101/30* (2013.01); *C02F 2103/08* (2013.01)

(58) Field of Classification Search
CPC ............ B01D 67/0046; B01D 2323/36; B01D 461/002; B01D 461/025; B01D 2325/38; B01D 2325/20; C02F 1/445; C02F 1/441; C02F 2101/12; C02F 2101/30; C02F 2103/08; C01B 19/007; C01B 17/20; C01G 39/06; C01P 2002/78; C01P 2002/84; C01P 2002/82; C01P 2006/22; C01P 2006/16; C01P 2004/24; C01P 2004/62; C01P 2004/64; C01P 2004/02; C01P 2004/03; C01P 2004/04; C01P 2004/20; B82Y 30/00; B82Y 40/00
See application file for complete search history.

(56) References Cited

U.S. PATENT DOCUMENTS

| | | |
|---|---|---|
| 2010/0075827 A1 | 3/2010 | Pellin et al. |
| 2011/0053284 A1 | 3/2011 | Meller et al. |
| 2013/0240356 A1 | 9/2013 | Wanunu et al. |
| 2014/0263178 A1* | 9/2014 | Sinton .................. B01D 67/006 216/56 |
| 2015/0258502 A1* | 9/2015 | Turowski ........... B01D 67/0072 210/650 |
| 2018/0169585 A1* | 6/2018 | Kawakatsu ............ B01D 65/06 |
| 2019/0070566 A1* | 3/2019 | Kidambi .............. B01D 61/243 |
| 2019/0076792 A1* | 3/2019 | Dryfe ................. B01D 67/0046 |

OTHER PUBLICATIONS

Wang et al. 2014 A WS2 nanosheet-based platform for fluorescent DNA detection via PNA-DNA hybridization. Analyst, 2015, 140, 434-439 DOI: 10.1039/c4an01738b (Year: 2014).*

Zhu et al. 2017 Two-Dimensional Materials as Prospective Scaffolds for Mixed-Matrix Membrane-Based CO2 Separation. ChemSusChem 2017, 10, 3304-3316 DOI : 10.1002/cssc. 201700801 (Year: 2017).*

Deng et. al. 2017 Stability, Molecular Sieving, and Ion Diffusion Selectivity of a Lamellar Membrane from Two-Dimensional Molybdenum Disulfide. Nano Lett. 2017, 17, 2342-2348. DOI: 10.1021/ acs.nanolett.6b05238 (Year: 2017).*

Zhao et al. 2014 Two-Dimensional Material Membranes: An Emerging Platform for Controllable Mass Transport Applications. small 2014, 10, No. 22, 4521-4542. DOI: 10.1002/smll.201401549 (Year: 2014).*

\* cited by examiner

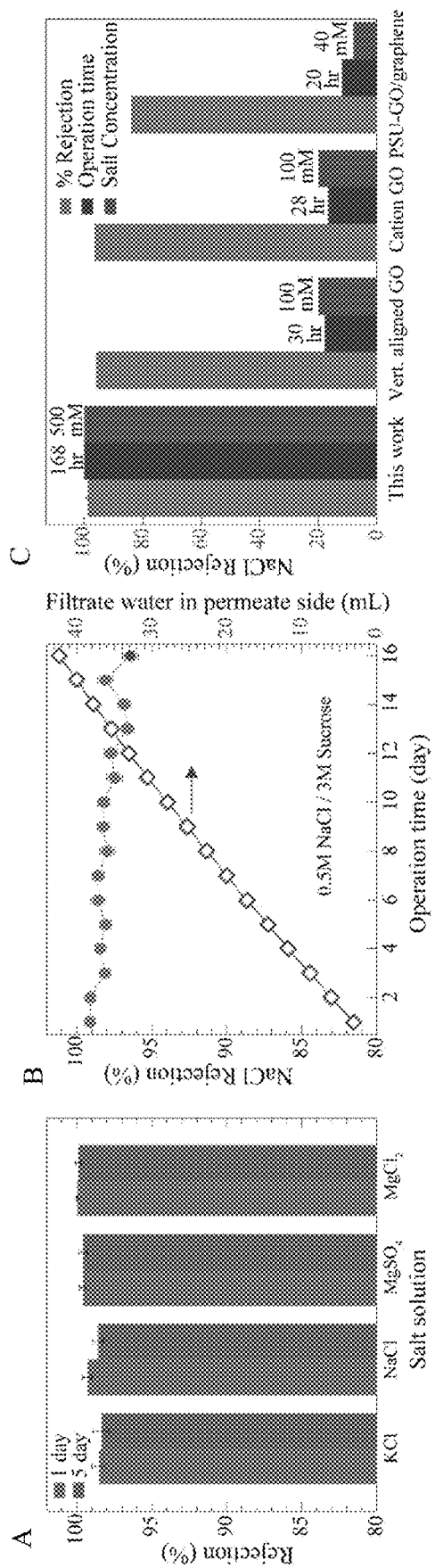
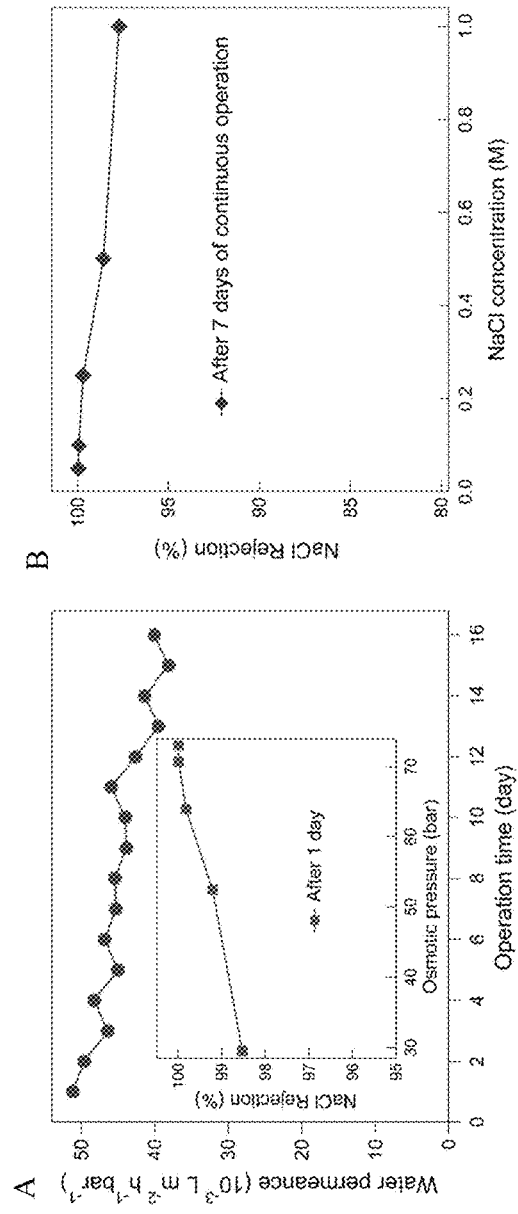
FIGS. 12A-12C
FIGS. 13A-13B

POROUS MEMBRANES COMPRISING NANOSHEETS AND FABRICATION THEREOF

CROSS REFERENCE TO RELATED APPLICATIONS

This application claims the benefit under 35 USC § 119 of U.S. Provisional Patent Appl. Nos. 62/536,228, filed Jul. 24, 2017, and 62/573,262, filed Oct. 17, 2017. The provisional applications are both incorporated by reference herein in their entireties.

STATEMENT REGARDING FEDERALLY SPONSORED RESEARCH OR DEVELOPMENT

This invention was made with government support under Grant No. EFMA-1542707 awarded by the National Science Foundation. The government has certain rights in the invention.

BACKGROUND

Increasing global need for potable water is a major challenge facing sustainable life on our planet. While water is available in ample quantities on earth, the vast majority (>98%) is in undrinkable form (e.g., seawater, brackish water, sewage water). Viable solutions to the water problem demand new materials and processes that can efficiently purify water from contaminated sources, which includes removal of debris, biological matter, organic and inorganic impurities, and various salts. The most challenging impurities are salts and small neutral organics, because their hydrodynamic size is most comparable to water molecules, complicating size-based separations. Thus, highly selective membranes with controlled morphology and chemical functionality that can efficiently reject ions as well as neutral species while allowing rapid water transport are in dire need (Refs. 1, 2).

Two-dimensional laminar membranes have shown promise in various areas such as water desalination and purification, solvent purification, gas separations, and energy storage. Molybdenum disulfide ($MoS_2$) membranes have shown advantages over graphene-based membranes for water desalination due to their resistance to swelling in water, although challenges such as low ion rejection for high salinity water and low water flux have delayed their adoption.

Recently, advanced nanoscale materials have garnered interest for water purification purposes. For example, ultrathin, carbon-based two-dimensional (2D) materials such as graphene and graphene oxide (GO) are good membrane candidates due to their mechanical/thermal/chemical stability, controllable porosity, and controlled chemical functionality (Refs. 3-7). GO membranes also have low cost and good manufacturability (Refs. 6, 8, 9). Membranes based on GO are typically multi-layered, and transport occurs in between stacked GO flake laminates as well as through any pores or defects between the flakes. The interlayer spacing, which alters the performance of these membranes, is controlled by methods such as crosslinking (Ref 8), casting in epoxy (Ref 6), and pre-use immersion in various salts for several weeks (Ref 5). Several limitations of these membranes are: (1) membrane swelling in water, which lowers ion selectivity due to increased interlayer spacing (Refs. 6, 10); (2) low water transport due to friction-type interaction between water and functional groups on the graphene surface, which cover 40-60% of the GO surface (Ref 11) and results in only a partial utilization of the 2D channel geometry; and (3) reduced lifetime (the membranes typically being functional for a few hours before loss of efficacy and/or mechanical failure due to swelling or dissolution) (Refs. 12-14).

In addition to carbon-based materials, other 2D materials such as molybdenum disulfide ($MoS_2$) have been explored for water desalination, revealing some distinct features such as zero-swelling in water (Refs. 13, 15) and improved water flux over their carbon-based analogues (Refs. 13, 16).

Although numerous strategies have been adopted to generate nanopores in 2D materials, among them being focused electron beam ablation (Ref 17), ion bombardment followed by chemical oxidation etching (Ref 18), UV-induced oxidative etching (Ref 19), and controlled electrochemical reaction (Ref 20), research efforts have been directed primarily at the control of inter-layer spacing (size exclusion mechanism) in 2D laminate membranes (LMs), which is unlikely to offer high selectivity for small ions (Ref 21).

There remains a need to develop robust, porous, semipermeable membranes with high water permeance and high selectivity for water over water-born solutes such as salts and organic molecules that can be used for high efficiency, low cost water purification methods like reverse osmosis.

SUMMARY

The present technology provides porous membranes comprising stacked layers of nanosheets. The nanosheets comprise a 2D material such as a transition metal dichalcogenide. The membrane comprises a network of water permeation pathways. The membranes can be produced to have different surface charges, pore sizes, and interlayer spacings, and can efficiently filter out small-molecule organic dyes and reject salts with permeance exceeding 200 $Lm^{-2}h^{-1}bar^{-1}$, which is approximately 100-fold higher than commercial seawater reverse osmosis membranes. The membrane shows stable operation for over one month.

In one aspect, the present technology provides a porous membrane comprising stacked layers of nanosheets. The nanosheets comprise (i) one to five atomic layers of a 2D material comprising or consisting of one or more transition metal dichalcogenides and (ii) pores having diameters in the range from about 10 nm to about 60 nm; and the membrane comprises a network of water permeation pathways. The pathways comprise through-pathways formed by the pores, horizontal pathways formed by gaps between the layers, and vertical pathways formed by gaps between adjacent nanosheets and stacking defects between the layers.

Embodiments of the above porous membrane can include one or more of the following features. The membrane can further comprise a plurality of nanodisks disposed between layers of said nanosheets or between adjacent nanosheets. The nanodisks comprise one to five atomic layers of a 2D material comprising or consisting of one or more transition metal dichalcogenides, and have diameters in the range from about 10 to about 60 nm. In some embodiments, the nanosheets and/or nanodisks comprise one to four atomic layers of a 2D material comprising or consisting of one or more transition metal dichalcogenides. In certain embodiments, the nanosheets and/or nanodisks comprise one to four atomic layers of a 2D material comprising or consisting of one or more transition metal dichalcogenides.

As used herein "diameter" means the largest distance from edge to edge of a nanosheet or a nanodisk. The shape of the nanosheet or nanodisk is not restricted to circular, but can be approximately circular, approximately elliptical, or irregular.

The one or more transition metal dichalcogenides can be one selected from the group consisting of $MoS_2$, $WS_2$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$. The membrane can have a thickness of 5 nm to 5 µm. For example, the thickness can be from 0.5 µm to 1.5 µm. The membrane can further comprise a plurality of amphipathic molecules adsorbed onto the nanosheets via hydrophobic interactions. Suitable amphipathic molecules can include a detergent, such as an anionic detergent (e.g., an alkylbenzenesulfonates), a cationic detergent (e.g., CTAB (hexadecyltrimethyl ammonium bromide), or a zwitterionic detergent (e.g. CHAPS). Alternatively, the amphipathic molecule can be a peptide having both charged and hydrophobic amino acids. The charged amino acid can have a positive or a negative charge.

In some embodiments, the peptide comprises alternating hydrophobic amino acids and positively or negatively charged amino acids. The 2D material can comprise or consist of $MoS_2$. The diameters of the nanosheets can range from about 140 nm to about 1600 nm. In some embodiments, the water permeance of the membrane is at least 200 $Lm^{-2}h^{-1}bar^{-1}$. In one embodiment, the water permeance is at least 500 $Lm^{-2}h^{-1}bar^{-1}$. Further, the membrane has a rejection rate of charged or uncharged solutes of at least 80%. In certain embodiments, the membrane has a rejection rate of charged or uncharged solutes of at least 99%. In various embodiments the membrane has salt rejection of about 80-85%, about 85-90%, about 90-95%, about 95-99%, about 85-88%, about 88-91%, about 91-94%, about 94-97%, about 97-99%, or about 97-99.5%.

In another aspect, the present technology provides a method of preparing porous nanosheets, the nanosheets comprising a 2D material comprising a transition metal dichalcogenide. The method comprises the steps of: (a) forming a dispersion of a 2D material in a solvent; (b) sonicating the dispersion using a bath sonicator to obtain an exfoliated dispersion of the 2D material; (c) sonicating the exfoliated dispersion using a probe sonicator to obtain an exfoliated dispersion comprising a mixture of porous 2D material nanosheets and nanodisks; and (d) removing the nanodisks from the mixture, thereby obtaining the porous nanosheets. In step (a), the 2D material can be provided as a powder. Also, the 2D material can be a naturally occurring material. In step (d), separating the mixture can be done by centrifugation, filtration, or allowing the mixture to stand undisturbed at 1×g. The transition metal dichalcogenide is selected from the group consisting of $MoS_2$, $W_{s2}$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$.

In one embodiment, the transition metal dichalcogenide is $MoS_2$. In step (b) the bath sonicator can be used at a power of 15 to 30 W for a period of 3 to 5 hours. In step (c), the probe sonicator can be used at a power of 400 to 600 W for a period of 1.5 to 3 hours. The method can further comprise the step (e) of: adsorbing a plurality of amphiphilic molecules onto the nanosheets obtained in step (d). The amphiphilic molecules can be a peptide having charged and hydrophobic amino acids.

In yet another aspect, the present technology provides a method of preparing nanodisks. The method comprises the steps of: (i) performing steps (a)-(c) of the above-described method of preparing porous nanosheets to obtain the exfoliated dispersion comprising a mixture of porous 2D material nanosheets and nanodisks; (ii) separating the mixture obtained in step (c) by a method comprising centrifugation, filtration, or allowing the mixture to stand undisturbed at 1×g, and collecting a supernatant or filtrate containing the nanodiscs; (iii) sonicating the supernatant or the filtrate in a bath sonicator, thereby obtaining a dispersion of nanodisks having diameters in the range from about 10 nm to about 60 nm. In one embodiment, the mixture is kept undisturbed for two days.

Also included in aspects of the present technology is a nanosheet comprising (i) one to three atomic layers of a 2D material comprising or consisting of one or more transition metal dichalcogenides, and (ii) one or more pores having a diameter in the range from about 10 nm to about 60 nm. The one or more transition metal dichalcogenides in the nanosheet can be one selected from the group consisting of $MoS_2$, $WS_2$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$.

In a further aspect of the present technology, provided herein is a nanodisk comprising one to three atomic layers of a 2D material comprising or consisting of one or more transition metal dichalcogenides, wherein the nanodisk has diameter in the range from about 10 to about 60 nm. The one or more transition metal dichalcogenides in the nanodisk can be one selected from the group consisting of $MoS_2$, $WS_2$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$.

In a further aspect, the present technology provides a method of making a porous membrane. The method includes the steps of (a) providing a suspension of a plurality of above-described nanosheets in a solvent; (b) filtering the suspension to obtain a compacted membrane precursor comprising a plurality of layers of the nanosheets; and (c) baking the membrane precursor, thereby obtaining the membrane. Step (b) can be performed using vacuum filtration. Step (c) can be carried out at a temperature from about 30° C. to about 70° C. for a time from about 8 hours to about 14 hours. The method can further comprise adding to the suspension in step (a) a plurality of above-described nanodisks. The filtering in step (b) can be performed using a porous anodisic alumina filter having a pore size of 0.01 to 0.03 µm. For example, the pore size can be about 0.02 µm.

Yet another aspect of the present technology is a method of purifying water, the method comprising causing the water to permeate through the above-described membrane (with or without the additional features) and collecting the permeate. The method can be used, for example, to desalinate the water or remove small organic molecules from the water. In this method the water can permeate due to reverse osmosis, forward osmosis, or gravity-fed filtration. Using the method, a salt rejection of at least 80% can be achieved. In one embodiment, a salt rejection of at least about 99% is achieved. In various embodiments salt rejection of about 80-85%, about 85-90%, about 90-95%, about 95-99%, about 85-88%, about 88-91%, about 91-94%, about 94-97%, about 97-99% 90-95%, about 95-99%, or about 97-99.5% can be achieved. Further, using this method, a water permeance of at least 200 $Lm^{-2}h^{-1}bar^{-1}$ can be achieved. In some embodiments, a water permeance of at least about 500 $Lm^{-2}h^{-1}bar^{-1}$ can be achieved. The water to be purified can be fresh water, brackish water, or seawater. Using this method, a permeate that is potable can be produced.

The present technology is also summarized by the following list of embodiments.

1. A porous membrane comprising stacked layers of nanosheets,
wherein the nanosheets comprise (i) one to three atomic layers of a 2D material comprising or consisting of one or more transition metal dichalcogenides and (ii) pores having diameters in the range from about 10 nm to about 60 nm; and
wherein the membrane comprises a network of water permeation pathways, the pathways comprising through-pathways formed by the pores, horizontal pathways formed by gaps between the layers, and vertical pathways formed by gaps between adjacent nanosheets and stacking defects between the layers.

2. The membrane of embodiment 1, further comprising a plurality of nanodisks disposed between layers of said nanosheets or between adjacent nanosheets; wherein the nanodisks comprise one to three atomic layers of a 2D material comprising or consisting of one or more transition metal dichalcogenides; and wherein the nanodisks have diameters in the range from about 10 to about 60 nm.

3. The membrane of embodiments 1 or 2, wherein the one or more transition metal dichalcogenides are selected from the group consisting of $MoS_2$, $WS_2$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$.

4. The membrane of any of the preceding embodiments having a thickness of 5 nm to 5 μm.

5. The membrane of embodiment 4, wherein the thickness is 0.5 μm to 1.5 μm.

6. The membrane of any of the preceding embodiments, further comprising a plurality of amphipathic molecules adsorbed onto the nanosheets via hydrophobic interactions.

7. The membrane of embodiment 6, wherein the amphipathic molecules comprise a peptide having both charged and hydrophobic amino acids.

8. The membrane of embodiment 7, wherein the peptide comprises positively charged amino acids.

9. The membrane of embodiment 7, wherein the peptide comprises negatively charged amino acids.

10. The membrane of embodiment 7, wherein the peptide comprises alternating hydrophobic amino acids and positively or negatively charged amino acids.

11. The membrane of any of the preceding embodiments, wherein the 2D material comprises or consists of $MoS_2$.

12. The membrane of any of the preceding embodiments, wherein the nanosheets have diameters in the range from about 140 nm to about 1600 nm.

13. The membrane of any of the preceding embodiments that has a water permeance of at least 200 $Lm^{-2}h^{-1}bar^{-1}$.

14. The membrane of embodiment 13 that has a water permeance of at least 500 $Lm^{-2}h^{-1}bar^{-1}$.

15. The membrane of any of the preceding embodiments that has a rejection rate of charged or uncharged solutes of at least 80%.

16. The membrane of embodiment 15 that has a rejection rate of charged or uncharged solutes of at least 99%.

17. A method of preparing porous nanosheets, the nanosheets comprising a 2D material comprising a transition metal dichalcogenide, the method comprising the steps of:
(a) forming a dispersion of a 2D material in a solvent;
(b) sonicating the dispersion using a bath sonicator to obtain an exfoliated dispersion of the 2D material;
(c) sonicating the exfoliated dispersion using a probe sonicator to obtain an exfoliated dispersion comprising a mixture of porous 2D material nanosheets and nanodisks; and
(d) removing the nanodisks from the mixture, thereby obtaining the porous nanosheets.

18. The method of embodiment 17, wherein the 2D material is provided in step (a) as a powder.

19. The method of embodiment 17 or 18, wherein the 2D material provided in step (a) is a naturally occurring material.

20. The method of any of embodiments 17-19, wherein step (d) comprises separating the mixture by a method comprising centrifugation, filtration, or allowing the mixture to stand undisturbed at 1×g.

21. The method of any of embodiments 17-20, wherein the transition metal dichalcogenide is selected from the group consisting of $MoS_2$, $WS_2$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$.

22. The method of any of embodiments 17-21, wherein the transition metal dichalcogenide is $MoS_2$.

23. The method of any of embodiments 17-22, wherein in step (b) the bath sonicator is used at a power of 15 to 30 W for a period of 3 to 5 hours.

24. The method of any of embodiments 17-23, wherein in step (c) the probe sonicator is used at a power of 400 to 600 W for a period of 1.5 to 3 hours.

25. The method of any of embodiments 17-24, further comprising the step of:
(e) adsorbing a plurality of amphiphilic molecules onto the nanosheets obtained in step (d).

26. The method of claim 25, wherein the amphiphilic molecules comprise a peptide having charged and hydrophobic amino acids.

27. A method of preparing nanodisks, the method comprising the steps of:
(i) performing steps (a)-(c) of embodiment 17 to obtain the exfoliated dispersion comprising a mixture of porous 2D material nanosheets and nanodisks;
(ii) separating the mixture obtained in step (c) by a method comprising centrifugation, filtration, or allowing the mixture to stand undisturbed at 1×g, and collecting a supernatant or filtrate containing the nanodiscs;
(iii) sonicating the supernatant or the filtrate in a bath sonicator, thereby obtaining a dispersion of nanodisks having diameters in the range from about 10 nm to about 60 nm.

28. The method of embodiment 27, wherein the transition metal dichalcogenide is selected from the group consisting of $MoS_2$, $WS_2$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$.

29. The method of embodiment 27 or 28, wherein in step (iii) the bath sonicator is used at a power of about 15 to 30 W for a period of 3 to 5 hours.

30. The method of any of embodiments 27-29, wherein the transition metal dichalcogenide is $MoS_2$.

31. A nanosheet comprising (i) one to three atomic layers of a 2D material comprising or consisting of one or more transition metal dichalcogenides, and (ii) one or more pores having a diameter in the range from about 10 nm to about 60 nm.

32. The nanosheet of embodiment 31, wherein the one or more transition metal dichalcogenides are selected from the group consisting of $MoS_2$, $WS_2$, $MoSe_2$, $WSe_2$, $MoTe_2$, WTe$_2$, NbS$_2$, ReS$_2$, NbSe$_2$, ReSe$_2$, NbTe$_2$, ReTe$_2$, NiS$_2$, NiSe$_2$, NiTe$_2$ZrS$_2$, PdS$_2$, ZrSe$_2$, PdSe$_2$, ZrTe$_2$, PdTe$_2$, TaS$_2$, TaSe$_2$, TaTe$_2$, TiS$_2$, TiSe$_2$, TiTe$_2$, HfS$_2$, HfSe$_2$, and HfTe$_2$.

33. The nanosheet of embodiment 31 or 32, wherein the one or more transition metal dichalcogenides consist of MoS$_2$.

34. The nanosheet of any of embodiments 31-33 having a diameter in the range from about 140 nm to about 1600 nm.

35. The nanosheet of any of embodiments 31-34, further comprising a plurality of amphiphilic molecules adsorbed to the nanosheet by hydrophobic interactions.

36. The nanosheet of embodiment 35, wherein the amphiphilic molecules comprise a peptide having charged and hydrophobic amino acids.

37. A nanodisk comprising one to three atomic layers of a 2D material comprising or consisting of one or more transition metal dichalcogenides, wherein the nanodisk has diameter in the range from about 10 to about 60 nm.

38. The nanodisk of embodiment 37, wherein the one or more transition metal dichalcogenides are selected from the group consisting of MoS$_2$, WS$_2$, MoSe$_2$, WSe$_2$, MoTe$_2$, WTe$_2$, NbS$_2$, ReS$_2$, NbSe$_2$, ReSe$_2$, NbTe$_2$, ReTe$_2$, NiS$_2$, NiSe$_2$, NiTe$_2$ZrS$_2$, PdS$_2$, ZrSe$_2$, PdSe$_2$, ZrTe$_2$, PdTe$_2$, TaS$_2$, TaSe$_2$, TaTe$_2$, TiS$_2$, TiSe$_2$, TiTe$_2$, HfS$_2$, HfSe$_2$, and HfTe$_2$.

39. A composition comprising a mixture of a plurality of nanosheets according to any of embodiments 31-36 and a plurality of nanodisks according to any of claims 37-38.

40. A method of making a porous membrane, the method comprising:

(a) providing a suspension of a plurality of nanosheets according to any of embodiments 31-36 in a solvent;

(b) filtering the suspension to obtain a compacted membrane precursor comprising a plurality of layers of the nanosheets; and (c) baking the membrane precursor, thereby obtaining the membrane.

41. The method of embodiment 40, wherein step (b) is performed using vacuum filtration.

42. The method of embodiment 40 or 41, wherein step (c) is carried out at a temperature from about 30° C. to about 70° C. for a time from about 8 hours to about 14 hours.

43. The method of any of embodiments 40-42, further comprising adding to the suspension in step (a) a plurality of nanodisks according to embodiments 37-38.

44. The method of any of claims 40-43, wherein the filtering in step (b) is performed using a porous anodisic alumina filter having a pore size of 0.01 to 0.03 µm.

45. The method of embodiment 44, wherein the pore size is about 0.02 µm.

46. A method of purifying water, the method comprising causing the water to permeate through the membrane of any of embodiments 1-16 and collecting the permeate.

47. The method of embodiment 46, wherein the purifying comprises desalination of the water.

48. The method of embodiment 46 or 47, wherein the purifying comprises removing small organic molecules from the water.

49. The method of any of embodiments 46-48, wherein the water permeates due to reverse osmosis, forward osmosis, or gravity-fed filtration.

50. The method of any of embodiments 46-49, wherein a salt rejection of at least 80% is achieved.

51. The method of embodiment 50, wherein a salt rejection of at least about 99% is achieved.

52. The method of any of embodiments 46-51, wherein a water permeance of at least 200 Lm$^{-2}$h$^{-1}$bar$^{-1}$ is achieved.

53. The method of embodiment 52, wherein a water permeance of at least about 500 Lm$^{-2}$h$^{-1}$bar$^{-1}$ is achieved.

54. The method of any of embodiments 46-53, wherein a source of the water to be purified is fresh water, brackish water, or seawater.

55. The method of any of embodiments 46-54, wherein the permeate is potable.

BRIEF DESCRIPTION OF THE DRAWINGS

FIG. 2A shows topographic atomic force micrograph of porous MoS$_2$NSs, diameter less than 60 nm, dispersed on freshly-cleaved mica. The dark features in the middle of the NSs are pores formed from knockout of material from within the NS, whereas the ejected ND products are seen as dots in the image (Scale bar=500 nm). FIG. 2B upper and lower halves show thickness profiles of the porous NSs indicated by the upper and lower horizontal lines, respectively, in the topographic image. Most of the NSs are single layer with a few bilayers (higher contrast NSs in the image). FIG. 2C shows diameter distribution of the NDs and NSs.

FIG. 3A shows topographic atomic force micrograph of non-porous MoS$_2$NSs dispersed on freshly-cleaved mica (see Table 1). FIG. 3B shows topographic atomic force micrograph of porous MoS$_2$NSs, pore diameter less than 45 nm, dispersed on freshly-cleaved mica. The dark features in the NSs are pores formed from knockout of material from within the NS, whereas the ejected ND products are seen as dots in the image. Scale bar=500 nm. FIG. 3C depicts the thickness profile of a non-porous MoS$_2$NS (identified by the horizontal line in the topographic image of FIG. 3A) showing the NS to be four layers thick. FIG. 3D depicts the thickness profile of a porous MoS$_2$NS (identified by the horizontal line in the topographic image of FIG. 3B). Down spike in the line profile is due to a pore in the nanosheet.

FIG. 4A shows a topographic image of a porous MoS$_2$NS of 1 µm thickness, diameter less than 10 nm, on freshly-cleaved mica. Arrows show pore as well as knock-off products from within the sheet, which are of similar diameter as the diameter of the pores. FIG. 4B shows a topographic AFM image of a porous MoS$_2$NS, diameter less than 25 nm and thickness of about 1.4 µm, where intra-sheet hole and knock-off products (NDs) are shown by black arrows. FIG. 4C depicts the thickness profile of the NS of FIG. 4A along the horizontal line indicated, showing the porous NS to be a bilayer. FIG. 4D depicts the thickness profile of the NS of FIG. 4B along the horizontal line indicated, showing the knock-off product (NDs) to be three layers thick, which is same as the thickness of the porous NS.

FIG. 5A is a high-resolution TEM image of peptide-decorated porous $MoS_2$NSs (diameter<10 nm), showing a sub-nm pore. FIG. 5B is a high-resolution TEM image of peptide-decorated porous $MoS_2$NSs (diameter<10 nm), showing a pore of about 5 nm. Scale bar=5 nm.

FIGS. 12A-12C show data for salt rejection and stability of peptide modified (pep (+), pep (−)) porous NSND (pore size <10 nm) membrane under continuous operation. FIG. 12A shows percentage reduction for four different salts (0.5 M) by the membrane (see Example 2) after 1 and 5 days of continuous operation using 3M sucrose as a draw solution. FIG. 12B shows NaCl (0.5 M) rejection by the membrane (see Example 2) under continuous operation for more than 15 days (left axis), and continual increase in filtrate water measured in the permeate side during the continuous operation (right axis). Error bars denote statistical reproducibility (n≥3 for all measurements). FIG. 12C shows comparison of the performance of the NSND membrane with respect to % rejection, operation time, and salt concentration, with other selected membrane materials (see Refs. 4, 5, and 6).

FIGS. 13A-13B show data for the stability of peptide modified (pep (+), pep (−)) porous NSND (pore size <10 nm) membrane under continuous operation and NaCl rejection. FIG. 13 A shows water permeance by the membrane under continuous operation for more than 15 days using 3 M sucrose as a draw solution and 0.5 M NaCl in the feed. Slight decrease in the permeance, observed over time, could be related to a decrease in osmotic pressure due to dilution of the draw solution by the permeated water in the permeate side during the continuous operation. The inset shows NaCl rejection as a function of osmotic pressure. FIG. 13B is a graph showing NaCl rejection of the membrane (see Example 2) as a function of concentration. 100% rejection, even after 7 days of continuous operation, was observed for NaCl below 0.3 M.

DETAILED DESCRIPTION

A simple and scalable ultrasonication method to stochastically create porous 2D material nanosheets (NSs) that result in a mixture of one-to-three layers thick porous nanosheets (NSs) and nanodisks (NDs). The 2D material can be a $MoS_2$ or $WS_2$. The method allows control over the mean nanopore size by adjusting the processing time and the intensity of sonication. The surface charge of the porous NS/ND mixture (NSND) can be controlled by adsorbing amphiphilic molecules such as a surfactant or peptides having hydrophobic as well as charged amino acids on the nanosheets, nanodisks or both. Freestanding membranes formed by stacking these nanomaterials on a porous alumina support are highly stable, and further demonstrate high water transport rates and ion selectivity. Without being limited by any theory or mechanism of action, it is believed that the observed high selectivity due to a combination of size-exclusion and electrostatic interactions. High water permeance displayed by the membranes is due to the enhanced porosity within membrane, arising from intrasheet-pores as well as the interspersed NDs, which act as spacers (void-agents) between larger NSs.

Figures 1A, 1B, 1C, 1D, 1E:
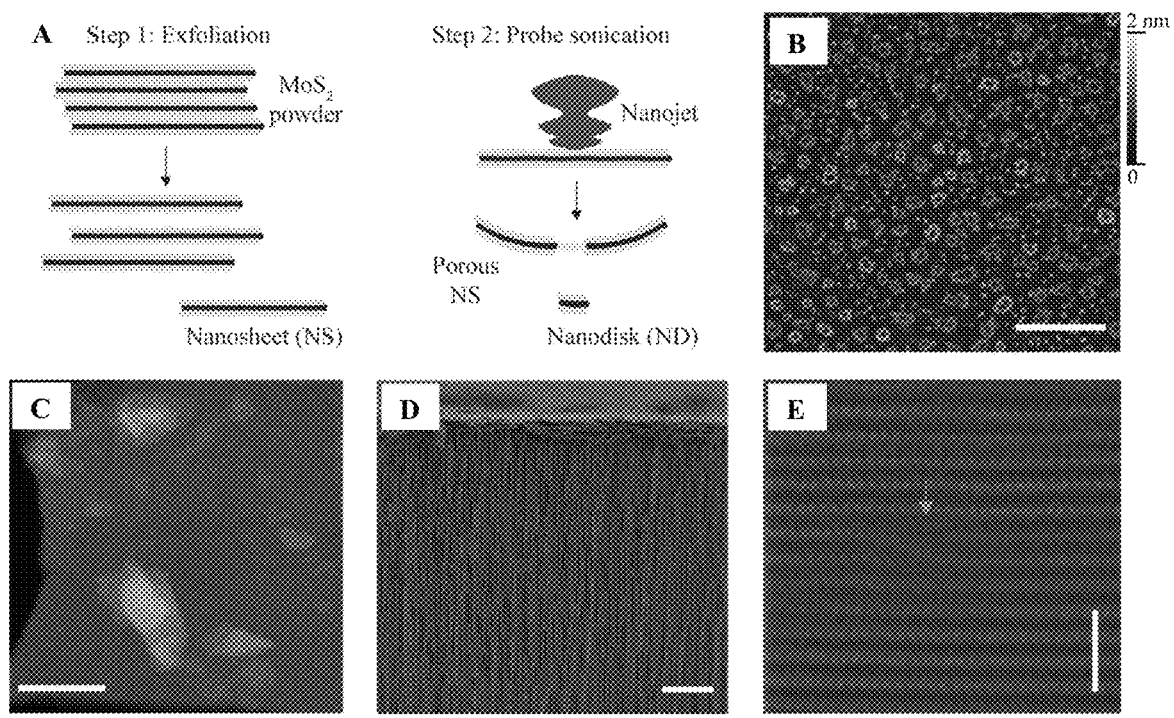
FIG. 1A is a schematic representation of a two-step process for preparing porous MoS$_2$ nanosheets (NSs).
FIG. 1B is a topographic atomic force micrograph of porous NSs, prepared as shown in FIG. 1A, dispersed on freshly-cleaved mica (Scale bar=500 nm).
FIG. 1C is a birds-eye dark-field STEM image of the laminate membrane, showing interspersed nanodisks (NDs) and NSs as brighter features (Scale bar=50 nm).
FIG. 1D is a cross-sectional SEM image of a laminate NS-ND membrane supported onto an Anodisc alumina filter, where the approximate 1 µm thickness is highlighted by two horizontal lines at top right (Scale bar=5 µm).
FIG. 1E is a high-resolution TEM image of a laminate cross-section, showing an interlayer spacing of 6.2 Å and stacking faults induced by nanosheet porosity and intersheet/ND stacking defects. A defect that results in interlayer voids is shown by orange arrow (Scale bar=2 nm).
Figure 10:
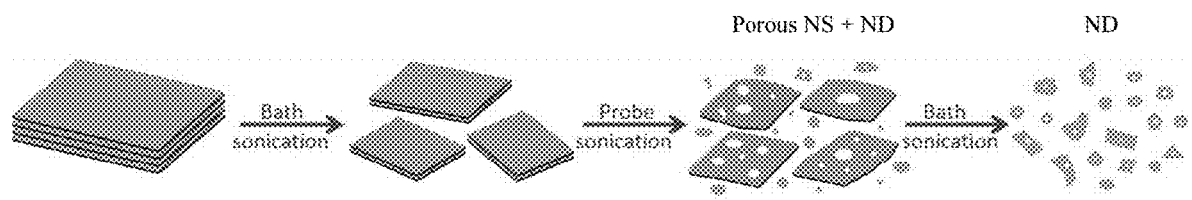
FIG. 10 is a schematic illustration of the preparation of porous $MoS_2$Nanosheets and nanodisks.

Porous nanosheets comprising a transition metal dichalcogenide 2D material according to the present technology can be prepared by forming a dispersion of the 2D material in a solvent; sonicating the dispersion using a bath sonicator to obtain an exfoliated dispersion of the 2D material; sonicating the exfoliated dispersion using a probe sonicator to obtain an exfoliated dispersion comprising a mixture of porous 2D material nanosheets and nanodisks; and finally removing the nanodisks from the mixture, thereby obtaining the porous nanosheets. Obtaining the mixture of porous 2D material nanosheets and nanodisks is schematically illustrated in FIGS. 1A and 10. Nanosheets having pores in the size range of 10 to 60 nm is obtained by this method. Nanodisks, can be made by first obtaining an exfoliated dispersion comprising a mixture of porous 2D material nanosheets and nanodisks as described; separating the mixture obtained by a method comprising centrifugation, filtration, or allowing the mixture to stand undisturbed at 1×g, and collecting a supernatant or filtrate containing the nanodiscs; and sonicating the supernatant or the filtrate in a bath sonicator. Nanodisks having diameters in the range from about 10 nm to about 60 nm are obtained.

A method of making a porous membrane according to the present technology comprises using a suspension of nanosheets prepared as described above. The suspension is filtered to obtain a compacted membrane precursor having a plurality of layers of the nanosheets and baking the membrane precursor, thereby obtaining the membrane. In some embodiments, the method further comprises adding a plurality of nanodisks to the suspension of nanosheets.

Figures 16A, 16B:
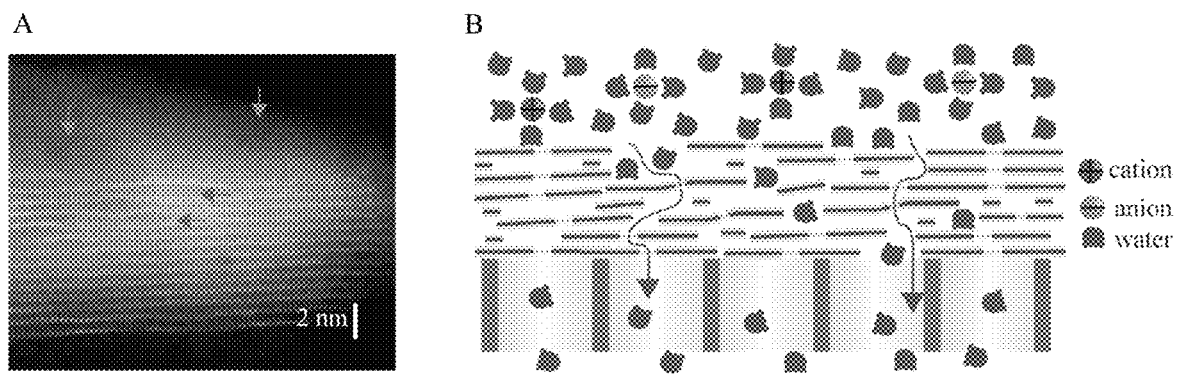
FIG. 16A is a dark-field scanning TEM image of a thin peptide-modified NSND layer showing an average interlayer spacing of 7.8±1.6 Å, pockets of wider intersheet gaps—presumably due to peptide intercalation (horizontal arrows), and voids due to porous sheet structure (vertical arrows). Image is 512×512 pixels, taken at 300 kV at 3.6Mx magnification using a HAADF detector, pixel dwell time of 40 μs.
FIG. 16B is a schematic illustration of the proposed mechanism of ion filtration through a NSND laminated membrane, where trajectories depict hypothetical paths of least resistance for water permeation, and selectivity is achieved by exclusion due to steric and electrostatic ion-surface interactions.
Figures 17A, 17B:
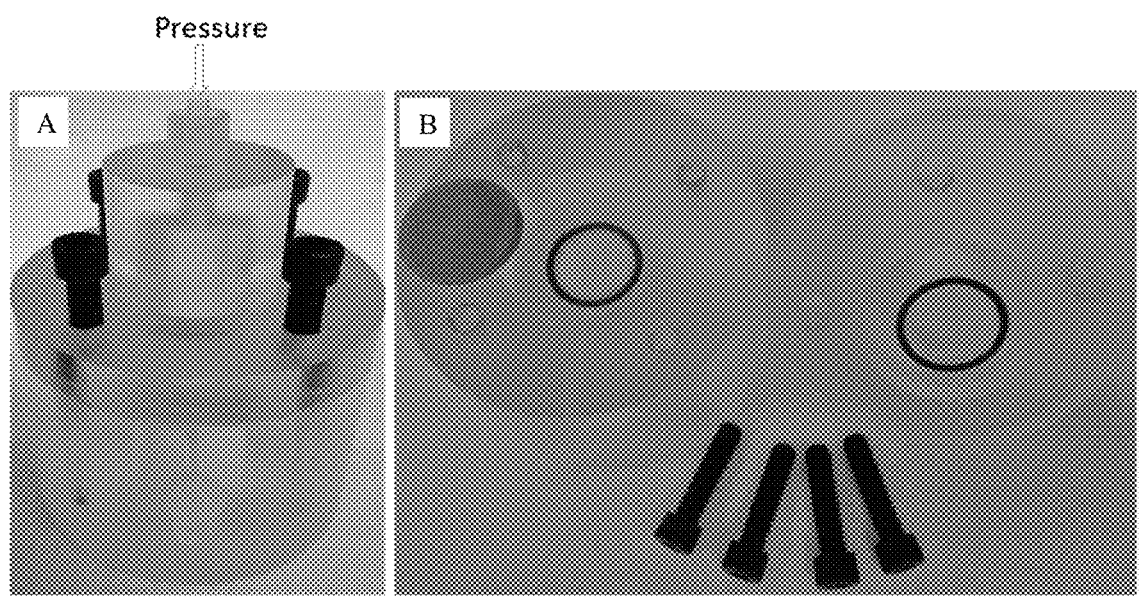
FIG. 17A is a photograph of an acrylic cell used for pressure-driven water permeance experiments. Feed compartment is shown on top, and permeate compartment is shown at the bottom. Pressure was applied to feed compartment (shown by arrow) by connecting a hose to a regulated $N_2$ tank. Membranes were kept between two O-rings and fixed using four screws to provide a good seal.
FIG. 17B is a photograph of the acrylic cell showing an inside view. An O-ring arrangement, as well as a 25-mm porous supporting metal disc to mechanically support the anodisc alumina filter (top left) is shown.

Porous membranes of the present technology comprise stacked layers of nanosheets. The nanosheets include (i) one to three atomic layers of a 2D material comprising or consisting of one or more transition metal dichalcogenides and (ii) pores having diameters in the range from about 10 nm to about 60 nm. The membrane comprises a network of water permeation pathways that include through-pathways formed by the pores, horizontal pathways formed by gaps between the layers, and vertical pathways formed by gaps between adjacent nanosheets and stacking defects between the layers (see FIG. 16). The one or more transition metal dichalcogenide of the membranes can be selected from the group consisting of $MoS_2$, $WS_2$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$. The thickness of the membranes is in the range of 5 nm to 5 µm, e.g., from 0.5 µm to 1.5 µm.

The membranes can be modified to include a plurality of amphipathic molecules adsorbed onto the nanosheets via hydrophobic interactions. Exemplary amphipathic molecules are surfactants, such as an anionic, cationic detergent, or a zwitterionic detergent. Amphipathic molecules can also be peptides that have both charged (positive or negative) and hydrophobic amino acids. In some embodiments, the peptide comprises alternating hydrophobic amino acids and positively or negatively charged amino acids.

The membranes described herein can efficiently filter out salt, displaying a rejection of NaCl of greater than 99%. Accordingly, a method of purifying water to remove salt is provided, the method comprising causing the water to permeate through a membrane made according to the present technology and collecting the permeate. The source of the water can be fresh water, brackish water, or seawater.

The membranes can be used also for removing small organic molecules from the water.

The water for removal of salt or organic molecules can be made to permeates due to reverse osmosis, forward osmosis, or gravity-fed filtration.

The membranes can also filter out small-molecule organic dyes. Further, the membranes exhibit permeance exceeding 220 LMH/bar, which is approximately 100-fold higher than commercial seawater reverse osmosis membranes. Also, the membranes show stable operation for over a month, indicating usefulness in high-performance membranes.

The present technology is further described by the following examples, which should be construed as illustrative, and not limitative of the remainder of the disclosure in any way.

EXAMPLES

Example 1: Preparation of Porous Nanosheet-Nanodisk Mixture

Materials—

The following chemicals were used. Molybdenum disulfide powder<2 µm at 99% purity (Sigma-Aldrich), 1-methyl-2-pyrrolidone (NMP) (from Fisher Scientific). All materials were used as received. Peptides (white lyophilized powder) were purchased from Genscript (http://www.genscript.com/) at >95% purity (HPLC purified), and were dissolved in ultrapure deionized water (Millipore, Billerica, Mass.) before use.

Synthesis Method—

$MoS_2$ nanosheet-nanodisk mixture (NSND) was prepared from natural $MoS_2$ powder using a two-step method (FIG.

Figures 2A, 2B, 2C:
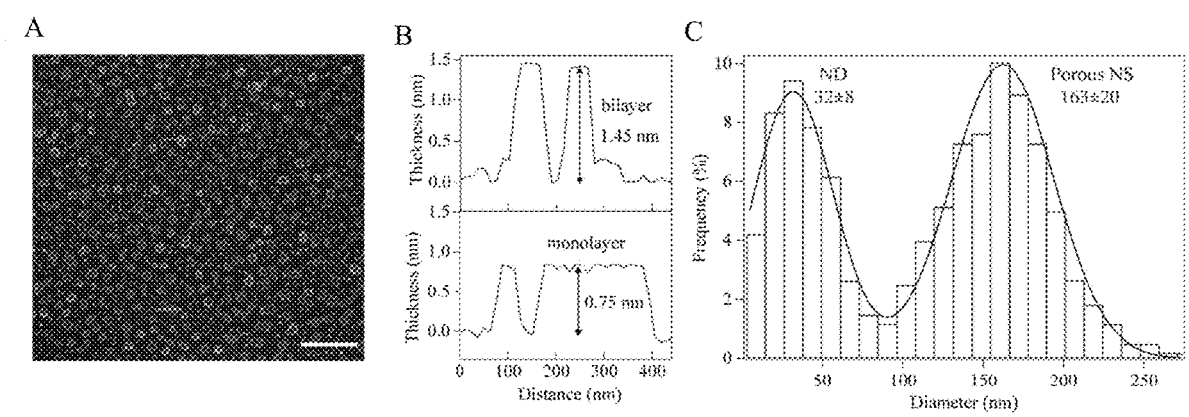
FIGS. 2A-2C show physical features of the porous MoS$_2$NSs and NDs (Category B, Table 1) made according to the present technology.
Figures 3A, 3B, 3C, 3D:
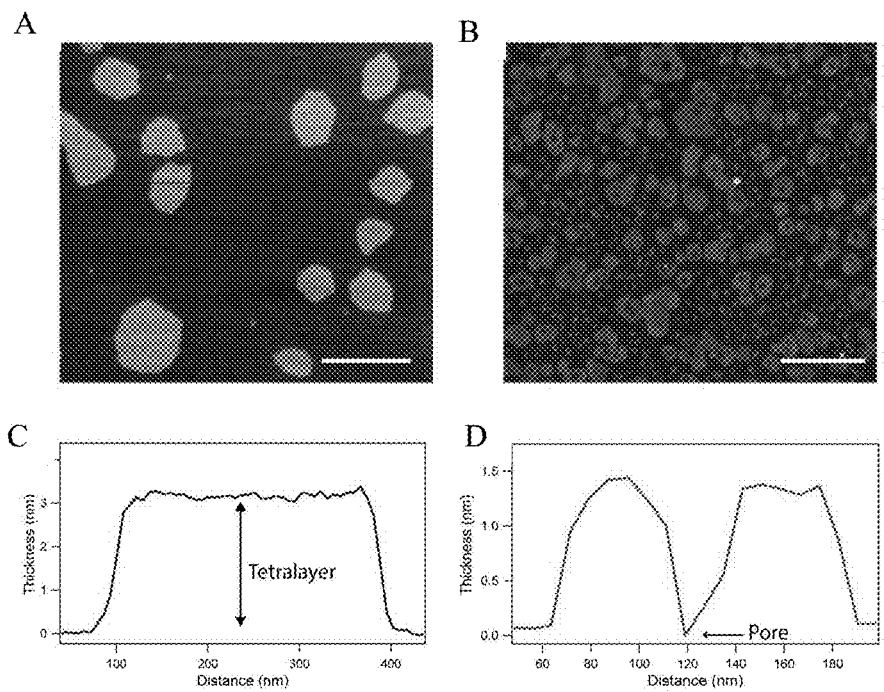
FIGS. 3A-3D show characterization of non-porous (Category A, Table 1) and porous MoS$_2$NSs (Category C, Table 1; pore diameter less than 45 nm).

1A). One gram of natural MoS₂ powder was added to 100 mL NMP solvent in a beaker and kept for bath sonication (Branson 2510 Ultrasonic) for 4 hours at a power of 20 W. This led to ultrasound-assisted exfoliation and milling of bulk $MoS_2$ into thinner and smaller particles, with breaking of covalent bonds, yielding an exfoliated dispersion. Non-covalent interactions between sheets of $MoS_2$ (held together by weak van der Waals forces) are also broken in this step. Upon cooling down to room temperature, the exfoliated dispersion was further sonicated in a second step with a probe sonicator (Hielscher UIP 500H) for 2 hours. For the probe sonication, the rotary regulator for pulse control was set to 1 (continuously switched on). The oscillation amplitude of the sonotrode was set to 100 (amplitude %), since higher amplitude results in a more effective creation of cavitation (formation, growth, and implosive collapse of vacuum bubbles in liquid). The high intensity ultrasound is expected to lead to cavitation, with enhanced heterogeneous nucleation due to the presence of suspended $MoS_2$ nanosheets (Ref 24). Cavitation is a complex phenomenon, but it can lead to extreme conditions including temperatures significantly exceeding 1000 K and can cause high-shear liquid jets with high velocities (Refs. 24, 25). These jets and associated shock waves introduce holes in the $MoS_2$ nanosheets, which may be aided by rapid acceleration and collision of the $MoS_2$ particles (Ref 24). Production of nanoholes was accompanied by the creation of nanodisks of size similar to the nanoholes (FIG. 2C), indicating that the second sonication step 'punches out' holes in the nanosheets from which the NDs are formed.

Intrasheet-pore diameter in the $MoS_2$ nanosheets (NSs) were tuned by altering the duration of bath and probe sonication time and adjusting a rotary regulator of the probe sonicator as explained in the above. The Table below provides the control parameters and the summary of the results obtained.

TABLE 1

| Category | Bath sonication (hr.) | Probe sonication (hr.) | Pore diameter (nm)[A] | Average NS diameter (nm) | NS layers |
|---|---|---|---|---|---|
| A | 4 | — | No pores | 352 ± 44 | tri-tetralayer |
| B | 4 | 2 | <60 | 163 ± 20 | single-bilayer |
| C | 4 | 1 | <45 | 285 ± 46 | single-bilayer |
| D | 3 | 1 | <10 | 785 ± 83 | single-bilayer |
| E | 2 | 1 | <10 | 1090 ± 101 | single-trilayer |
| F | 1 | 2 | <25 | 1472 ± 176 | bi-trilayer |

[A] pore size in the MoS₂ sheets was estimated from AFM measurements.

Figures 4A, 4B, 4C, 4D:
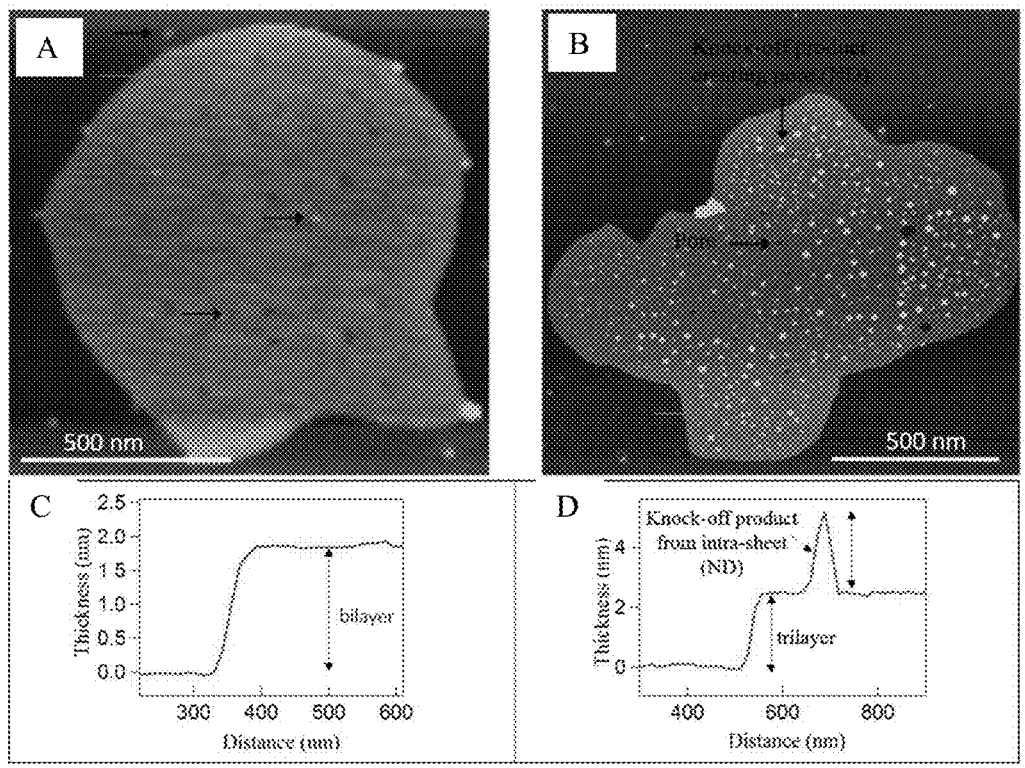
FIG. 4A-4D show AFM images providing proof-of-concept of size-controllable synthesis of NSs as well as intra-sheet pores (Category E and F, Table 1).
Figures 5A, 5B:
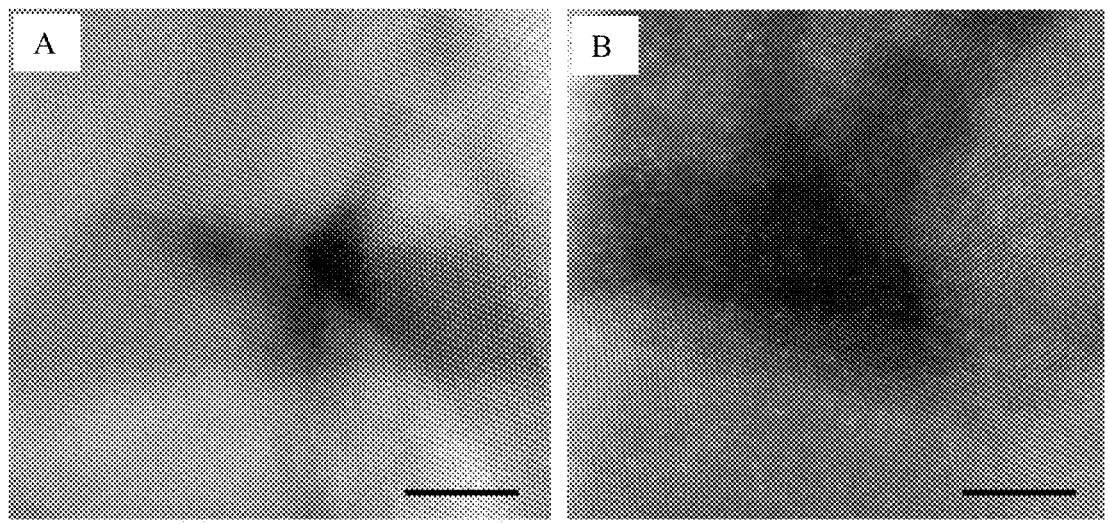
FIGS. 5A and 5B show further characterization of the porous $MoS_2$ nanosheets.
Figures 6A, 6B:
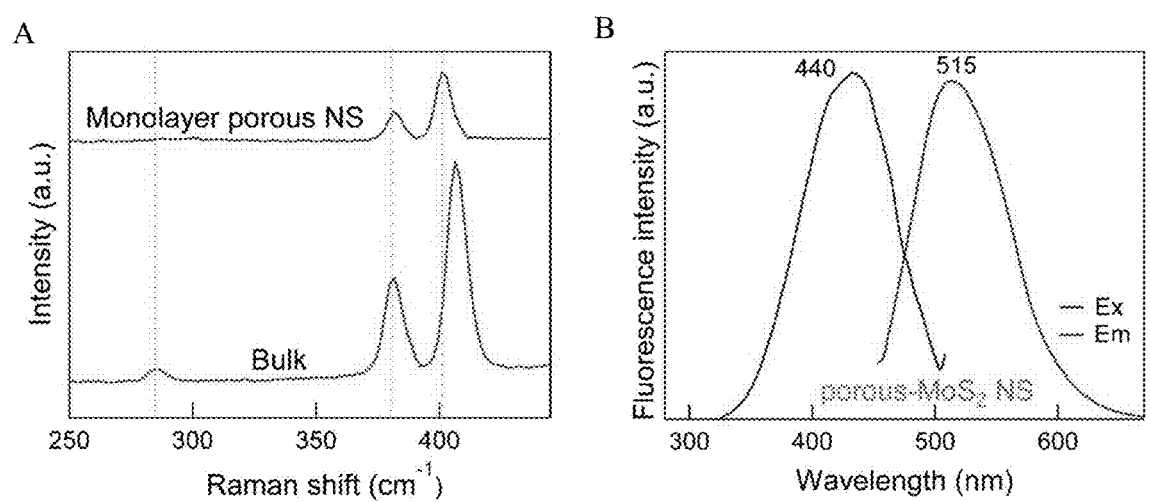
FIG. 6A is Raman spectrum of bulk (lower trace) and porous NS (upper trace). In the bulk sample, the peak around 286 cm', corresponding to monolayer porous-$MoS_2$, is absent. Further, the separation between two modes is 19.53 $cm^{-1}$, which confirms the $MoS_2$NS to be a single layer.
FIG. 6B shows fluorescence excitation and emission spectra of porous $MoS_2$NS.

Although single as well as multiple pores were observed in the individual smaller diameter nanosheets, the number of pores per-nanosheet significantly increases in the relatively bigger diameter nanosheets. For example, an average of 30 pores (pore size <10 nm) in nanosheets of average size~1 μm (FIG. 4) was observed. The number of pores could be significantly higher, because the detection of smaller size pores (i.e., less than 5 nm in diameter) along with nanosheet of average diameter ~1 μm is beyond the resolution limit of AFM used (average tip radius about 10 nm). High-resolution scanning TEM (HR-TEM) image of the same sample shows pores as small as ~1 nm (FIGS. 5A and 5B).

An AFM image of porous $MoS_2$NSs prepared, as described, from natural bulk $MoS_2$ powder (<2 μm) using a 4-hour bath sonication step, followed by a 2-hour probe sonication step is shown in FIG. 1B. The average NS diameter was found to be 163±20 nm. Average hole size was 32±8 nm. The dark features in the middle of the NSs are pores formed from knockout of material from within the NSs, whereas the ejected ND products are seen scattered throughout in the image. The height profiles of the NSs follows a binary distribution of predominantly two heights, 0.7 nm and 1.4 nm (FIG. 2B), corresponding to 1 and 2 layers thick porous NSs. A dark-field scanning TEM image of a thin portion of a laminate membrane made from the mixture of nanosheets and nanodisks is shown in FIG. 1C, where numerous NDs and small NSs are seen as bright features.

Purification and Transfer of Porous NS/NDs from NMP to Water—

Transfer of porous NSs/NDs from NMP to water was carried out in two steps: first from NMP to methanol, and second from methanol to water. In the first step, 20 mL of methanol was added to 10 mL of the exfoliated dispersion of NSs/NDs in NMP and the resulting dispersion was centrifuged at 5000 rpm for 30 min and repeated 3-4 times to remove the multilayer $MoS_2$ flakes. Finally, the resultant product was dialyzed in a dialysis bag (Spectra/Por Biotec Cellulose Ester, 100-500 Da) against methanol for 15 hours to remove unwanted chemical and residues. After dialysis-based purification, porous NSs/NDs in methanol was added dropwise to deionized water with gentle stirring using a steel needle. The vial was kept open in a dust-free environment to allow methanol to evaporate while stirring gently with a steel needle every 20 min for a few hours. The process was continued until the dark dispersion of $MoS_2$ in water was observed.

Example 2: Preparation of Nanosheet-Nanodisk Laminate Membranes

Nanosheet-nanodisk laminate membranes (NSND LMs) were prepared by vacuum filtration of suspensions with equal nanomaterial volumes and concentrations, as reported previously for graphene oxide membranes (Ref 27). Membranes of about 1 μm thickness was obtained, as confirmed using cross-sectional SEM measurements (see FIG. 1D). The vertically-oriented lines in the image show the supported alumina filter, whereas the NSND-LM is horizontally oriented (parallel lines indicate 1 μm laminate film thickness). A closer look at the structure of the LM is seen in FIG. 1E, where high-resolution TEM shows stacking faults induced by the heterodimensional structure of the stacked sheets/disks in the LM. In this image, the average spacing between Mo atoms is 6.2 Å, in accordance with literature values (Refs. 13 and 28). It is believed that all of the structural features, namely, creation of channels by the NDs, creation of through-pathways by the porous structure of the NSs, as well as the stacking defects within the laminate, significantly affect water transport kinetics through the LM.

Figures 7A, 7B:
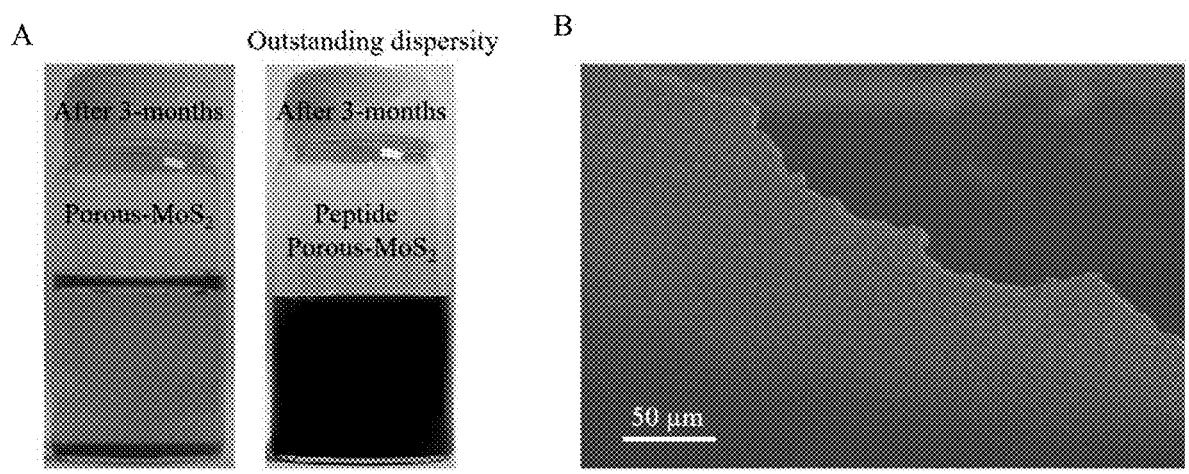
FIG. 7A shows photographs of porous $MoS_2$ in water (12.6 mg/mL), untreated (left) and treated with a peptide containing charged and hydrophobic amino acids (right), taken three months after preparation. The photographs indicate that adsorption of the peptide induces stability.
FIG. 7B is an SEM image of a freestanding membrane prepared from the suspension of porous $MoS_2$NSND having adsorbed peptides (peptide-decorated porous $MoS_2$NSND).
Figure 8:
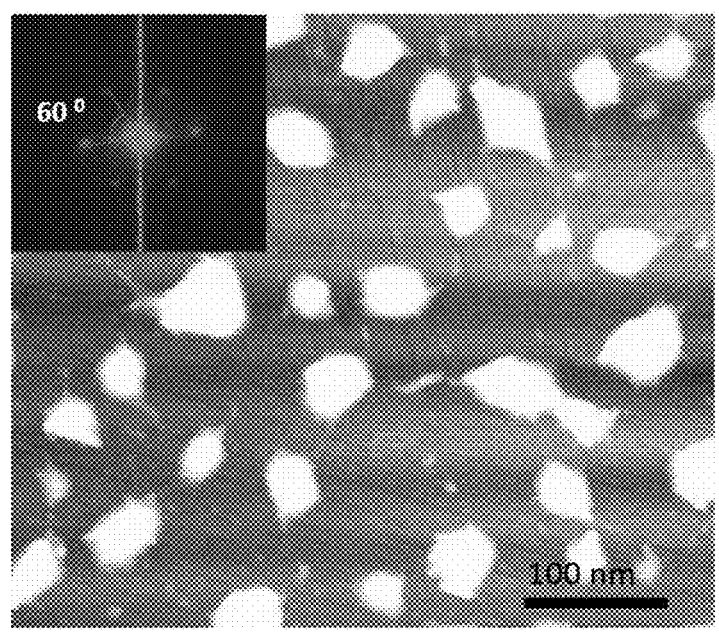
FIG. 8 is an AFM image showing a self-assembled film of the hydrophobic and charged amino acid peptide KFKFKFKF (SEQ ID NO:1) adsorbed onto $MoS_2$ surface. White spots are likely due to water adsorption by the hydrophilic peptide surface and ordered lines represent beta-tapes formed from peptide assembly on the $MoS_2$ surface. Inset is a Fast Fourier Transform of the image, which shows three possible orientations of the peptide on the surface.
Figures 9A, 9B, 9C, 9D, 9E:
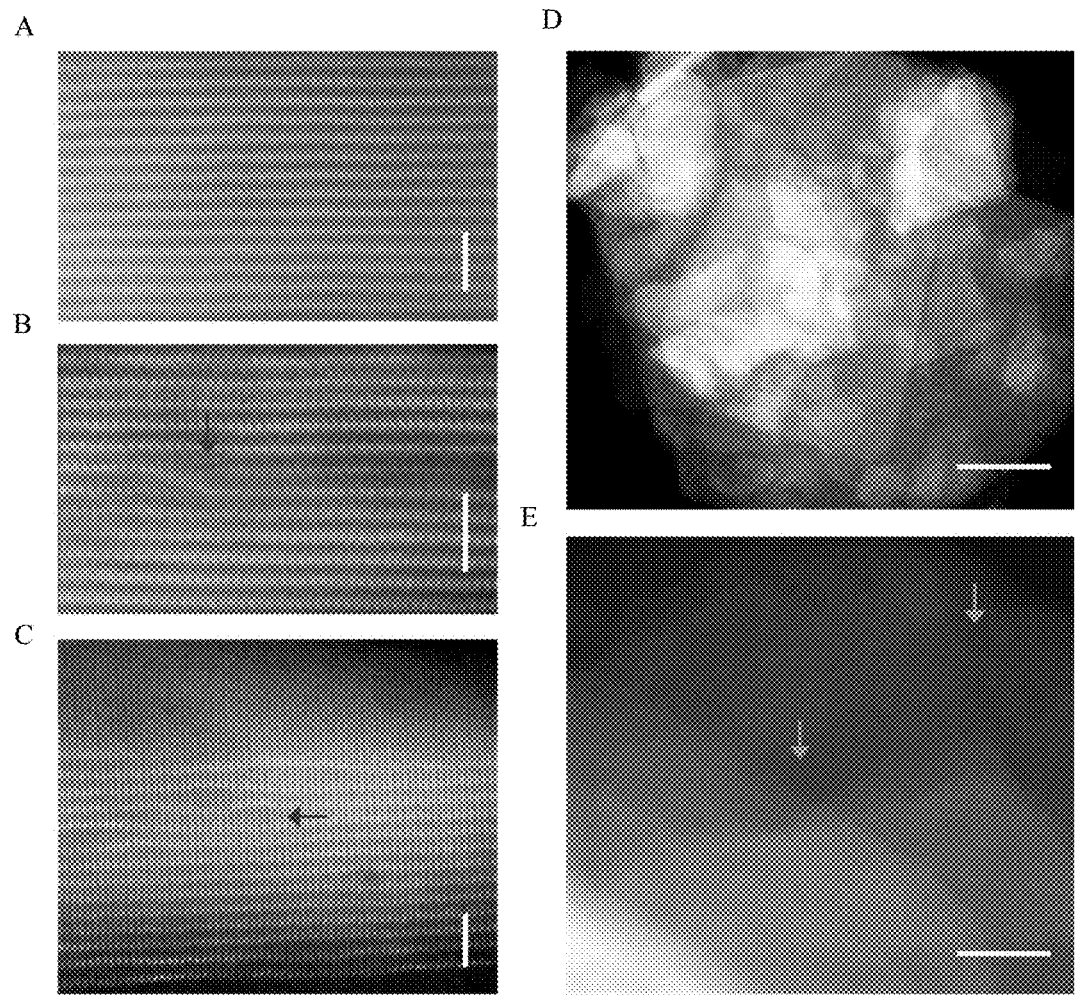
FIG. 9A is a high-resolution TEM image of a thin laminate cross-section of non-porous $MoS_2$NSs, showing highly-ordered layered structure of average interlayer spacing 6.2 Å.
FIG. 9B is a high-resolution TEM image of a thin laminate cross-section of porous $MoS_2$NSNDs, showing stacking faults induced by nanosheet porosity and intersheet/ND stacking defects. A defect resulting in interlayer voids is shown by the downward pointing arrow. This image is the same as the image shown in FIG. 1E.
FIG. 9C is a dark-field scanning TEM image of a thin peptide-modified porous NSND layer, with intersheet slits due to peptide intercalation shown by the horizontal arrow and voids due to porous sheet structure shown by the vertical arrow. The average interlayer spacing is 7.8±1.6 Å (Scale bars=2 nm).
FIG. 9D is a birds-eye dark-field STEM image of a NSND laminate, showing interspersed NDs and NSs as brighter features (scale bar=50 nm).
FIG. 9E is a high-magnification STEM image of the laminate shown in FIG. 9D. Arrows point to voids due to porous sheet structure (Scale bar=10 nm).

To understand the role of pores in the NSs and the NDs in determining transport properties, LMs consisting of only NS (without the pore-creating second step), NS without pores but with NDs, and NSNDs under different degrees of probe sonication (see Table 1) were prepared. To further modulate the surface charge and interaction between NSs, LMs were prepared in the presence of both negatively-charged and positively-charged peptides, referred to as pep. (−) and pep. (+). Two different $MoS_2$-binding peptides, eight amino acids in length and having four positively charged lysine (K) or negatively charged glutamic acid (E) residues alternating with the hydrophobic residue phenylalanine (F), i.e., KFKFKFKF (SEQ ID NO:2) and EFEFEFEF (SEQ ID NO:2), were prepared. These peptides self-assemble onto a $MoS_2$ surface (see FIG. 8) into extremely stable, flat, and ordered β-tape crystalline structure (Ref 1), in which the cationic (for peptide $(KF)_4$) or anionic (for peptide $(EF)_4$) hydrophilic residues face outward toward the aqueous phase to allow formation of stable colloids of $MoS_2$ in water. The resulting cationic or anionic peptide-decorated $MoS_2$ are better dispersed and highly stable in water for several months (see FIG. 7). The self-assembled peptides on the $MoS_2$ monolayer is also expected to influence interactions between nanosheets and LM assembly. Further, the peptides modulate the surface charge of the NSNDs by virtue of their charged amino acid residues. The combination of porous NSs, NDs, and peptides allow for systematic control of the membrane properties.

AFM imaging of $MoS_2$ and peptide organization on $MoS_2$—

AFM images of $MoS_2NS$ were collected at ambient temperature using fast scan dimension AFM (Bruker, USA) in tapping mode. Silicon cantilever were used (force constant 18 N/m, resonance frequency 1400 kHz). In order to perform AFM imaging of peptide organization on $MoS_2$ in liquid medium, the peptide was deposited in-situ while imaging using ~200 μL of imaging buffer. All resulting samples were imaged with AFM (Dimension Icon, FastScan-type scan head) using a soft, sharp (k=0.4 N/m, nominal tip radius=10 nm) cantilever in peak force imaging mode. While imaging the peptide, the peak force set point was kept below 4 nN. Images were processed using Nanoscope software.

Characterization Technique—

SEM images were obtained by using Hitachi S-4800 equipment. High resolution TEM images were obtained using probe-corrected FEI Titan Themis scanning transmission electron microscope (STEM) operated at 300 kV and using HAADF detector (High-angle annular dark-field detector).

Determination of $MoS_2$ Concentration—

Concentration of the as-prepared $MoS_2$ in the suspension was estimated by measuring mass of the $MoS_2$ in the suspension, which was obtained by extracting the $MoS_2$ using an anodic alumina filter (Whatman, 0.02 μm pore size and a diameter 25 mm) and measuring a mass of the nanomaterial collected on the filter. For example, 18 mg of the nanomaterial collected on the filter by passing 3 mL of the suspension yields concentration (6 mg/mL) of the nanomaterial in the suspension.

Example 3: Rejection of Salt

Figure 11:
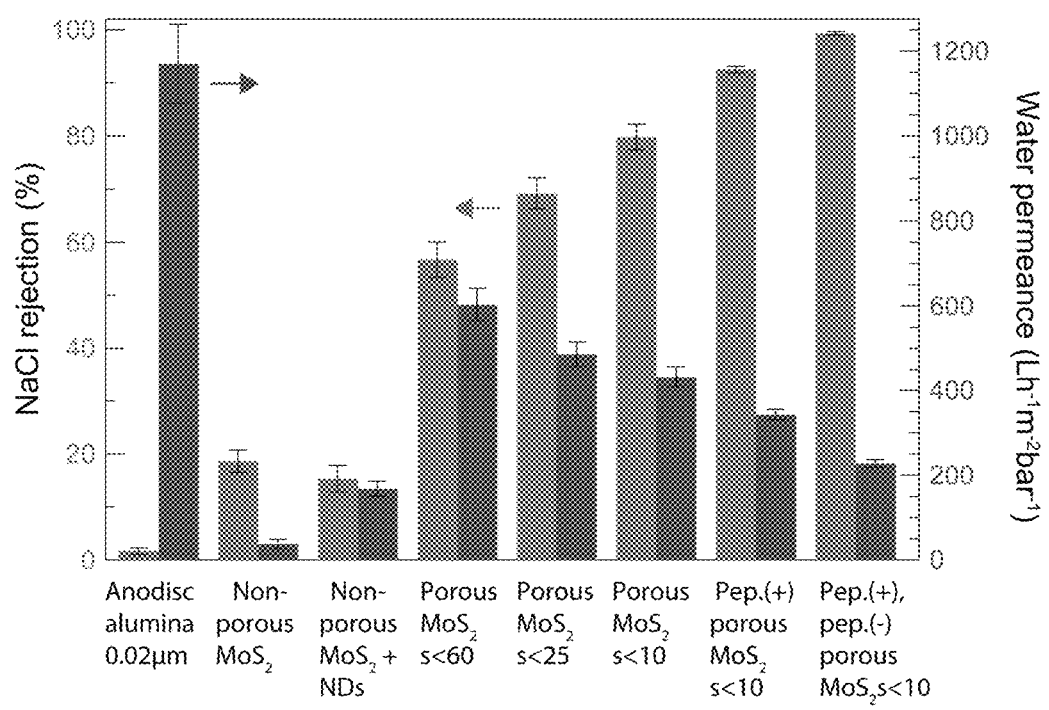
FIG. 11 is a graph showing comparison of aqueous NaCl (0.5 M) rejection (light bars) by a bare Anodisc alumina filter, a non-porous $MoS_2$NS membrane, a non-porous $MoS_2$NS membrane with NDs, porous $MoS_2$NS membrane of different pore diameters, and a peptide-decorated (pep. (+), pep. (−)) porous $MoS_2$NS membrane. Rejection (left axis) was measured after a 1-day sucrose-driven permeability experiment. Water permeance (right axis) was measured using a 1 bar external pressure difference (n≥3 for all measurements).
Figures 18A, 18B:
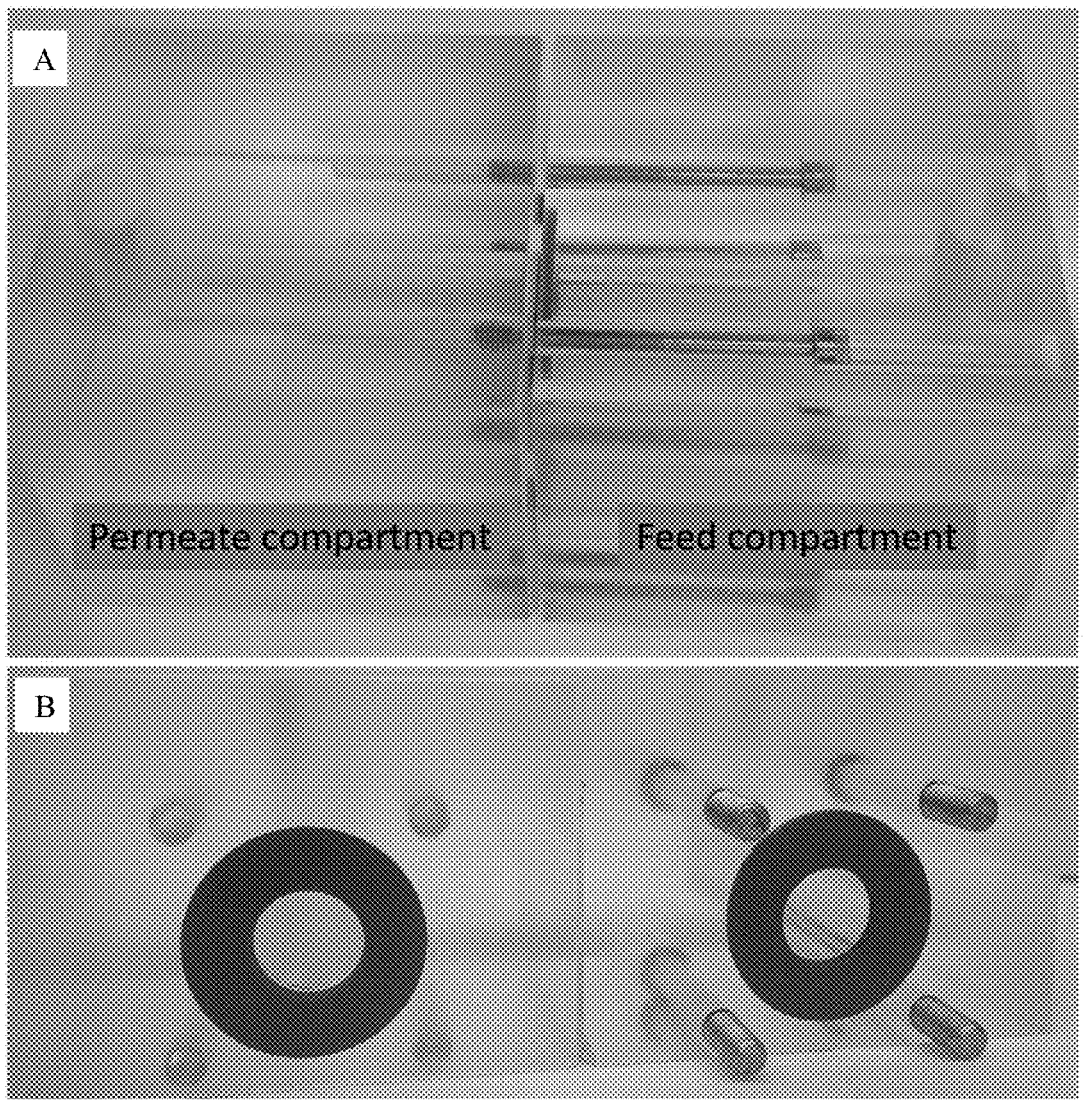
FIG. 18A is a photograph of a permeation cell used for ion sieving experiments. The cell is made of acrylic and has a feed and a permeate compartment. Membranes are kept between two silicone washers and fixed using four screws to provide air-tight environment.
FIG. 18B is a photograph of the inside view of feed and permeate compartments and shows the arrangement of the silicone washer along with four screws.

Porous NSND laminated membrane, about 1 μm thick and made as described above, was sandwiched between a feed and a permeate compartment (FIG. 18A) and used for carrying out salt rejection measurements. An ionic solution (0.5 M NaCl) was placed in the feed compartment and an osmolyte (3 M sucrose) was placed in the permeate compartment. Ion concentrations were measured in both compartments after a period of time. The measurements are shown in FIG. 11, in which the left axis summarizes the results obtained for 0.5 M NaCl rejection after one day for various laminated membranes composed of NSNDs with pore diameters <10 nm, <25 nm, and <60 nm (referred to as porous $MoS_2s<10$, porous $MoS_2s<25$, and porous $MoS_2s<60$, respectively). For comparison, bare Anodisc alumina support and non-porous $MoS_2NSLM$ were also evaluated. While the supported Anodisc filter and non-porous $MoS_2NSLM$ showed low rejection (<18%, consistent with the low rejection previously reported for NSLMs (Ref 13)), introduction of pores was found to significantly enhance NaCl rejection compared to non-porous NS laminated membranes. Porous $MoS_2s<60$ demonstrate a higher NaCl rejection (>57%), which improves to 80% rejection for the porous $MoS_2s<10$ sample. Although the pore size is large compared to the Debye electrostatic screening length (<1 nm), it is believed that the creation of a larger number of flow pathways that traverse between charged pore edges and the underlying nanosheets lead to improved salt rejection by facilitating transport of water in preference to that of ions. This behavior is also consistent with a prior study of graphene nanopores that indicates high ion selectivity in pores in the large regime (Debye length<pore radius), attributed to surface-charge mediated cation selectivity (Ref 29). Similarly, high salt rejection by nanoporous carbon composite membrane of a minimum pore size 30 nm was recently reported (Ref 30). Finally, it was observed that functionalization of NSND samples with the charged peptides has a dramatic impact on rejection, with ion rejection values reaching >99% at 0.5M NaCl ionic strengths (FIG. 11). Without being limited by any theory or mechanism of action, it is believed that this improvement is likely due to additional electrostatic interactions and also a tighter lamination of $MoS_2$ nanosheets due to attractive forces between oppositely charged nanosheets. It is also believed that composite membrane with two selective layers provides ultra-high water/ion selectivity (Ref 31).

Example 4: Rejection of Salt Commonly Found in Seawater

Rejection of salts commonly found in sea water by the pep (+), pep (−) porous $MoS_2NSND$ laminate membranes (pore size <10 nm) after 1 and 5 days of continuous operation was assessed. As shown in FIG. 12A, rejection rates follow a steric effect, with ions of larger hydrated radii being rejected more efficiently ($K^+<SO_4^{-2}<Cl^-<Na^+<Mg^{+2}$) (Ref 32). Given that water molecules form hydration shell to stabilize ions, and that hydrated shells of divalent ions are stronger than those of monovalent ones (Ref 6), divalent ions are expected to experience larger barriers to enter into sub-nm voids within the NSND laminate membranes. Nevertheless, for all salts examined, rejection above 98%, even after 5 days of continuous operation, was observed. Rejection of NaCl as a function of concentration was also evaluated. The membrane showed 100% rejection below 0.5M NaCl, even after 7 days of operation (see FIG. 13B). Since a major challenge with laminate membranes is their mechanical and chemical stability under prolonged use, continuous NaCl (0.5 M) salt rejection experiments were performed for 16 days (FIG. 12B). While a mild decrease in performance over this time was observed, the membrane demonstrated a steady performance of >96% NaCl rejection throughout. Further, as shown in FIG. 12B (right axis), the increase in total water permeated through the membrane was continuous, indicating little to no membrane clogging during prolonged use (see also Supplementary FIG. 13A). As shown in FIG. 12C, these results, favorably compare with those recently reported for functionalized or epoxy-encapsulated high-performance GO/graphene membranes, which is also true of the higher water permeance of the membranes described herein (5 $Lm^{-2}h^{-1}$ compared to 0.3 $Lm^{-2}h^{-1}$ (Ref 5) and 0.5 $Lm^{-2}h^{-1}$ (Ref 6); see Example 5 below).

Example 5: Water Transport

Water transport through the NSND laminated membrane was significantly affected by introduction of the pores and peptides (FIG. 11, right axis). First, as a control measurement, it was found that water permeance increased significantly (about 4 times) upon incorporation of NDs into non-porous NS-LM, suggesting that NDs may play a role in introducing nanochannels within the LM thereby facilitating water transport. Further, porous $MoS_2NSND$ laminated membranes with larger pore diameters were found to have higher water permeance values than those with smaller pores, suggesting that the extent of through-pathways within the laminated membrane shortens the path for water, thereby yielding higher water permeance values. The notable increase in water permeance rate by larger pores suggests that through-pathways, created by pores, dominate over the channels created by the NDs. Despite a decreased water permeance from (603±38.4) to (432±24.7) $Lh^{-1}m^{-2}bar^{-1}$ (LMH/bar) when going from <60 nm pores to <10 nm pores, it was found that NSND laminated membranes prepared with both peptides (for example, pep (+), pep (−) porous $MoS_2s<10$), maintain higher salt rejection (>99%) than NSND laminated membranes that contain exclusively positively charged peptides (~92%). Without being limited by any theory or mechanism of action, it is believed that the increase in salt rejection and the accompanying decrease in water flux can be attributed to tighter assembly of the oppositely-charged NSs either by stronger interactions or by filling in of any gaps or defects that may allow for salt transport. Based on these observations, it was concluded that the overall laminated membrane structure, which is determined by surface charge, morphology, and defect structure, plays an important role in water separation performance. A comparison of water permeance of the membranes described herein with earlier reported GO, graphene, $MoS_2$, and commercial membrane is provided in Table 2 below.

TABLE 2

| Membrane | Membrane thickness | Water Permeance (L h$^{-1}$ m$^{-2}$ bar$^{-1}$) | Reference |
|---|---|---|---|
| Shear aligned GO | 150 nm | 71 ± 5 | 9 |
| Nafion + PP2b | 17.5 μm | 3 | 34 |
| PEI + GO | n/a | 1.62 | 35 |
| PDA-coated GO | ~16 nm | 27.6 | 8 |
| GO + chitosan | n/a | 4.35 | 36 |
| commercial polyamide | n/a | 15.4 | 37 |
| modified co-polymer | 150 nm | 27 | 38 |
| GO/MWCNT | 40 nm | 11.3 | 39 |
| polyamide | n/a | 21 | 40 |
| ultrathin graphene | 53 nm | 3.3 | 41 |
| $MoS_2$ | 1 μm | 30 | 13 |
| Porous $MoS_2$-s10 | 1 μm | 432 | Present study |
| Porous $MoS_2$-s25 | 1 μm | 486 | Present study |
| Porous $MoS_2$-s60 | 1 μm | 603 | Present study |
| Cationic porous $MoS_2$-s10 | 1 μm | 343 | Present study |
| (Cationic + anionic) porous $MoS_2$-s10 | 1 μm | 228 | Present study |

Example 6: Forward Osmosis

Because of the low energy consumption, easy cleaning process, low fouling, and high salt rejection, forward osmosis (FO) is considered to be an attractive emerging technology for desalination applications (Ref 2). FO desalination uses water-soluble salt or other molecules (high concentrated solution) to generate osmotic pressure, which draws fresh water molecules spontaneously across a semi-permeable membrane from the low concentrated salt solution (feed solution). FO assisted desalination was performed by filling equal volume (10 mL) of sucrose (3 M) and NaCl or other salts solution (0.5 M) in the permeate and feed compartment (see FIG. 18), respectively, which was separated by the $MoS_2$ membrane (effective area 0.51 cm$^2$). Magnetic stirring was applied in both feed and permeate compartments to avoid possible concentration gradients. Osmotic pressure (H) of an aqueous solution can be determined by using Van't Hoff relation:

$$\pi = \Phi \iota RTM \qquad (1)$$

where M is the molar concentration (mol/L), R is the gas constant (0.08206 L atm·mol$^{-1}$·K$^{-1}$), T is the temperature in Kelvin, $\Phi$ is osmotic coefficient ($\Phi_{NaCl}$=0.93 and $\Phi_{sucrose}$=1.02), and ι is the number of ions or molecules into which the dissolved species dissociate ($\iota_{NaCl}$=2 and $\iota_{sucrose}$=1). With these values, equation (1) leads to the osmotic pressure gradient of about 53 bar, which pulls water molecules from the feed compartment to the permeate compartment. Salt (NaCl) rejection by the membrane under continuous operation is estimated by using equation 5 (see Example 8 below). The conductivity of the salt solutions was measured using an InPro conductivity sensor (Mettler Toledo).

Further, to test the mechanical robustness of the membranes, filtration of NaCl (0.5 M) was carried out for a prolonged period (>15 days) and NaCl rejection calculated after every 24 hours using equation 5. The observed 1.5 mL increase in permeate column with (pep (+), pep (−) porous $MoS_2s<10$)-NSND laminated over 6 hours corresponds to a water flux of 5 $Lm^{-2}h^{-1}$, which while lower than reverse osmosis, is remarkable for forward osmosis (Ref 3). The membrane showed 10-fold higher water flux (5 $Lm^{-2}h^{-1}$) than recently reported epoxy-encapsulated GO-Gr membrane (0.5 $Lm^{-2}h^{-1}$) (Ref 4) and 17-fold higher flux than cationic control GO membrane (0.3 $Lm^{-2}h^{-1}$) (Ref 5).

Example 7: Rejection of Small Organic Molecules

Figures 14A, 14B:
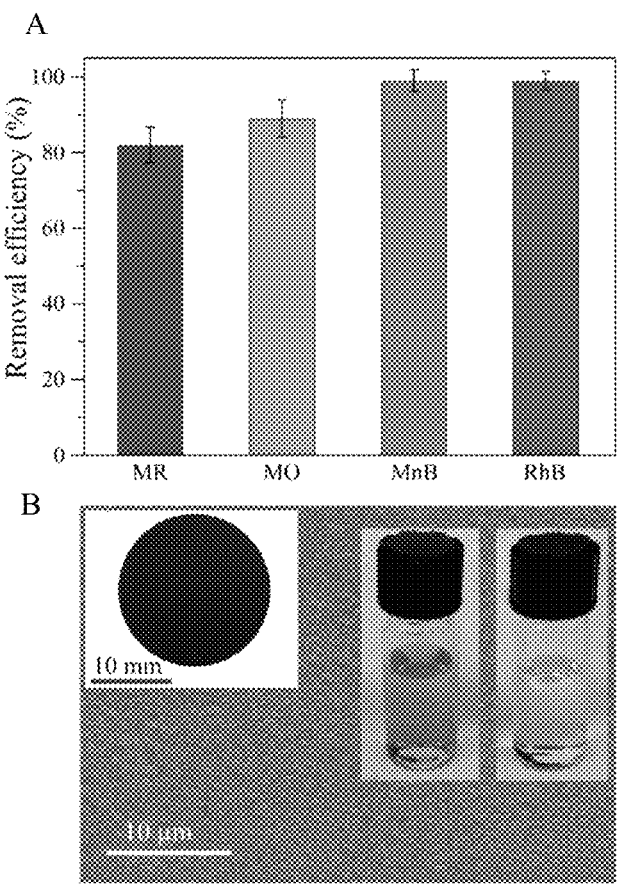
FIG. 14A is a graph for efficiency of dye rejection by peptide modified (pep (+), pep (−)) porous NSND (pore size <10 nm) membrane, measured using reverse osmosis with a 1 bar external pressure. The dyes tested were methyl red (MR, electroneutral, $R_H$=4.87 Å), methyl orange (MO, negative charge, $R_H$=4.97 Å), methylene blue (MB, positive charge, $R_H$=5.04 Å), and Rhodamine B (RhB, electroneutral, $R_H$=6.15 Å). Hydrated radii are taken from Ref 9. Error bars denote statistical reproducibility (n≥3 for all measurements).
FIG. 14B is a SEM image of the membrane and shows that the membrane has a smooth surface. Insets: Optical image of the membrane (left) and photographs of MB solution before and after filtration.
Figure 15:
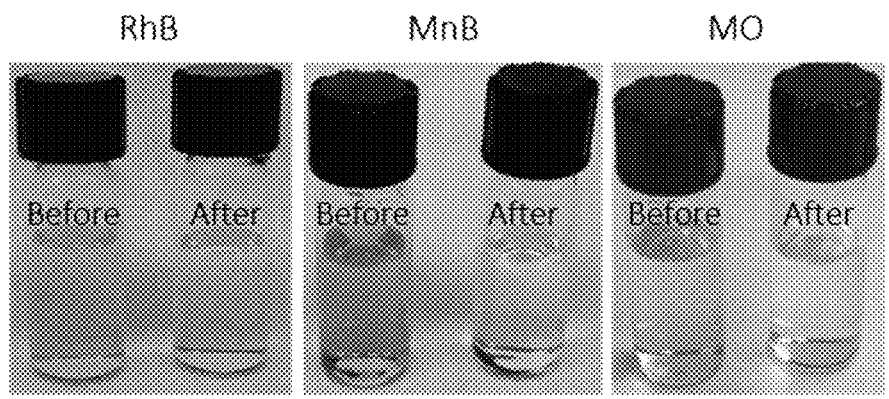
FIG. 15 is a set of photographs of dyes Rhodamine B (RhB), methylene blue (MnB), and methyl orange (MO), before and after filtration through peptide modified (pep (+), pep (−)) porous NSND (pore size <10 nm) membrane.

Finally, selectivity of the membrane for dye molecules with different charges and hydrated radii was studied (FIG. 14A). Filtration of dye solutions of methyl red (MR, electroneutral), methyl orange (MO, negative charge), methylene blue (MnB, positive charge), and rhodamine B (RhB, electroneutral) was performed using 1 bar external pressure, followed by UV-vis analysis of the feed and permeate solutions to evaluate the removal efficiency of the membrane. The membrane showed nearly 100% rejection for both the neutral and charged molecules with a hydrated radius above 5 Å (FIG. 14A). FIG. 14B shows an SEM image of the surface of the membrane. In the inset, a visual aspect of the membrane is shown.

Membrane fouling in pressure-driven processes is a challenge (Ref 33). The fouling behavior of a membrane depends on chemical and physical features of the membrane surface such as pore morphology, pore size, pore charge, and most importantly the hydrophobicity (Ref 6). The molecules of the organic foulant are likely to attach to the hydrophobic surface because of the hydrophobic-hydrophobic interaction. For example, membranes made of graphene and synthetic polymers such as polyvinylidene fluoride (PVDF), polysulfone, polyethersulfone (PES), and polyacrylonitrile (PAN), are highly prone to organic and biological fouling due to hydrophobic-hydrophobic interaction. On the other hand, water molecules are likely to adsorb by the hydrophilic surface due to its low interfacial energy, which minimizes the adsorption of the organic foulants (Ref 7). To evaluate the membrane dynamic fouling behavior, BSA (0.5 g/L) was chosen as a model organic foulant. Loop filtration was performed, which consisted of three steps: (i) filtration of pure water, (ii) filtration of BSA, and (iii) filtration of pure water after rising the membrane with pure water. The loop process was repeated for five cycles (times) to determine flux recovery (FR), which was obtained by using the following equation:

$$FR(\%) = \left(\frac{J_i}{J}\right) \times 100(\%) \tag{2}$$

where J is the initial flux of the membrane for pure water, $J_i$ is the membrane flux for water at the end of each loop process (after rinsing the membrane with pure water) after cycle i. The calculated average flux recovery value was 96±2%, which can be attributed to the possible hydrophilic nature as well as charged and smoothness of our membrane.

The average water flux for pure water (228±8.92) LMH/bar slightly decreased to (198±14.8) LMH/bar for foulant solution. The calculated average flux recovery value was 96±2%, which can be attributed to the charged smooth surface as well as possible hydrophilic nature of our membrane.

Example 8: Calculation of Permeability and Salt Rejection

Permeability of the membrane was calculated using the following relation:

$$\text{Permeability} = \frac{V_p}{t \cdot A \cdot \nabla P} \tag{3}$$

where $V_p$ is the permeate volume, t is the permeation time, A is the effective area of the membrane and $\nabla P$ is the applied pressure.

Salt rejection or desalination efficiency of the membrane was calculated by $$\text{Rejection}(\%) = \left(1 - \frac{C_p}{C_f}\right) \times 100(\%) \tag{4}$$

where $C_p$ and $C_f$ are the concentrations of salt or probe molecule in the permeate and the feed solution, respectively. Equation 3 is suitable for calculating the rejection for a short period of time. However, for several days of continuous operation, where one needs to add salt solution in the feed compartment and extract filtrate solution from the permeate compartment, rejection can be calculated by using the following relation:

$$R = \left(1 - \frac{(C_p + \Delta C_P) \times (V_p + \Delta V) - C_p V_p}{C_F \Delta V}\right) \tag{5}$$

where
$\Delta C_P$ = increase in the concentration of salt in the permeate side when its volume goes from $V_p$ to $(V_p + \Delta V)$
$V_p$ = Initial volume in the permeate side
$\Delta V$ = increase in volume in the permeate side
$C_F$ = concentration of salt in the feed side $(C_p + \Delta C_P) \times (V_p + \Delta V)$ is the final amount of salt on permeate side
$C_p V_p$ is the initial amount of salt on permeate side
$C_F \Delta V$ is the amount of salt that would have gone through in the case of zero rejection
If the condition $C_p \ll (1-R)C_F$ is satisfied, then the expression simplifies to:

$$R = \left(1 - \frac{V_p \Delta C_P}{C_F \Delta V}\right) \tag{6}$$

This follows from comparing the $V_p \Delta C_P$ and $C_p \Delta V$ terms. From Eq. (1) $(C_p + \Delta C_P) \times (V_p + \Delta V) - C_p V_p = (1-R)C_F \Delta V$. For small $\Delta V$, neglecting the $2^{nd}$ order term, we get $$V_p \Delta C_P + C_p \Delta V = (1-R)C_F \Delta V,$$
$$\text{which gives } \Delta C_P = [(1-R)C_F - C_p]\frac{\Delta V}{V_p}.$$

Hence, $$\frac{C_p \Delta V}{V_p \Delta C_p} = \frac{C_p \Delta V}{[(1-R)C_F - C_p]\Delta V} =$$
$$\frac{C_p/(1-R)C_F}{1 - C_p/(1-R)C_F} \ll 1 \text{ for } \frac{C_p}{(1-R)C_F} \ll 1.$$

Conductivity Probe Calibration—

To determine the concentration of salt on the permeate side, the conductivity probe was calibrated for each salt solution using their known concentrations. Since the forward osmosisstudy was performed using sucrose as a draw solution, the calibration was conducted in sucrose solution of same concentration while varying a range of salt concentrations. Quadratic regression was carried out to determine the calibration coefficients from the obtained data using the following relation:

$$C = a_0 + a_1\sigma + a_2\sigma^2 \tag{7}$$

where C is molar concentration of salt solution, $\sigma$ is the measured conductivity in mS/cm, and the quadratic regression coefficients $a_0$ and $b_0$ were determined by fitting the calibration equation.

REFERENCES

1. Werber, J. R., Osuji, C. O. & Elimelech, M. Materials for next-generation desalination and water purification membranes. *Nat. Rev. Mater.* 1, 16018 (2016).
2. Elimelech, M. & Phillip, W. A. The future of seawater desalination: energy, technology, and the environment. *Science* 333, 712-717 (2011).
3. Surwade, S. P. et al. Water desalination using nanoporous single-layer graphene. *Nat. Nanotechnol.* 10, 459-464 (2015).
4. Morelos-Gomez, A. et al. Effective NaCl and dye rejection of hybrid graphene oxide/graphene layered membranes. *Nat. Nanotechnol.* 12, 1083-1088 (2017).
5. Chen, L. et al. Ion sieving in graphene oxide membranes via cationic control of interlayer spacing. *Nature* 550, 380-383 (2017).

6. Abraham, J. et al. Tunable sieving of ions using graphene oxide membranes. *Nat. Nanotechnol.* 12, 546-550 (2017).
7. Jain, T. et al. Heterogeneous sub-continuum ionic transport in statistically isolated graphene nanopores. *Nat. Nanotechnol.* 10, 1053-1057 (2015).
8. Hu, M. & Mi, B. Enabling graphene oxide nanosheets as water separation membranes. *Environ. Sci. Technol.* 47, 3715-3723 (2013).
9. Akbari, A. et al. Large-area graphene-based nanofiltration membranes by shear alignment of discotic nematic liquid crystals of graphene oxide. *Nat Commun.* 7, 10891 (2016).
10. Yeh, C.-N., Raidongia, K., Shao, J., Yang, Q.-H. & Huang, J. On the origin of the stability of graphene oxide membranes in water. *Nat. Chem.* 7, 166 (2015).
11. Loh, K. P., Bao, Q., Eda, G. & Chhowalla, M. Graphene oxide as a chemically tunable platform for optical applications. *Nat. Chem.* 2, 1015 (2010).
12. Zheng, S., Tu, Q., Urban, J. J., Li, S. & Mi, B. Swelling of graphene oxide membranes in aqueous solution: characterization of interlayer spacing and insight into water transport mechanisms. *ACS nano* 11, 6440-6450 (2017).
13. Wang, Z. et al. Understanding the Aqueous Stability and Filtration Capability of MoS2 Membranes. *Nano Lett.* 17, 7289-7298 (2017).
14. Sun, P., Wang, K. & Zhu, H. Recent Developments in Graphene-Based Membranes: Structure, Mass-Transport Mechanism and Potential Applications. *Adv. Mater.* 28, 2287-2310 (2016).
15. Deng, M., Kwac, K., Li, M., Jung, Y. & Park, H. G. Stability, molecular sieving, and ion diffusion selectivity of a lamellar membrane from two-dimensional molybdenum disulfide. *Nano Lett.* 17, 2342-2348 (2017).
16. Hirunpinyopas, W. et al. Desalination and Nanofiltration through Functionalized Laminar MoS2 Membranes. *ACS nano* 11, 11082-11090 (2017).
17. Fischbein, M. D. & Drndić, M. Electron beam nanosculpting of suspended graphene sheets. *Appl. Phys. Lett.* 93, 113107 (2008).
18. O'Hern, S. C. et al. Nanofiltration across defect-sealed nanoporous monolayer graphene. *Nano Lett.* 15, 3254-3260 (2015).
19. Koenig, S. P., Wang, L., Pellegrino, J. & Bunch, J. S. Selective molecular sieving through porous graphene. *Nat. Nanotechnol.* 7, 728-732 (2012).
20. Feng, J. et al. Observation of ionic Coulomb blockade in nanopores. *Nature materials* 15, 850 (2016).
21. Esfandiar, A. et al. Size effect in ion transport through angstrom-scale slits. *Science* 358, 511-513 (2017).
22. Mi, B. Graphene oxide membranes for ionic and molecular sieving. *Science* 343, 740-742 (2014).
23. Homaeigohar, S. & Elbahri, M. Graphene membranes for water desalination. *NPG Asia Mater.* 9, e427 (2017).
24. Zhang, Y., Qian, Z., Ji, B. & Wu, Y. A review of microscopic interactions between cavitation bubbles and particles in silt-laden flow. *Renew. Sustain. Energy Rev.* 56, 303-318 (2016).
25. Shchukin, D. G., Skorb, E., Belova, V. & Möhwald, H. Ultrasonic cavitation at solid surfaces. *Adv. Mater.* 23, 1922-1934 (2011).
26. Suslick, K. Kirk-Othmer encyclopedia of chemical technology. *J. Wiley & Sons: New York* 26, 517-541 (1998).
27. Joshi, R. et al. Precise and ultrafast molecular sieving through graphene oxide membranes. *Science* 343, 752-754 (2014).
28. Rasamani, K. D., Alimohammadi, F. & Sun, Y. Interlayer-expanded MoS2. *Mater. Today* 20, 83-91 (2017).
29. Rollings, R. C., Kuan, A. T. & Golovchenko, J. A. Ion selectivity of graphene nanopores. *Nat Commun.* 7, 11408 (2016).
30. Chen, W. et al. High-flux water desalination with interfacial salt sieving effect in nanoporous carbon composite membranes. *Nat. Nanotechnol.* 13, 345-350 (2018).
31. Werber, J. R. & Elimelech, M. Permselectivity limits of biomimetic desalination membranes. *Sci. Adv* 4, eaar8266 (2018).
32. Wang, L. et al. Fundamental transport mechanisms, fabrication and potential applications of nanoporous atomically thin membranes. *Nat. Nanotechnol.* 12, 509-522 (2017).
33. van der Marel, P. et al. Influence of membrane properties on fouling in submerged membrane bioreactors. *J. Membrane Sci.* 348, 66-74 (2010).
34. Cohen, E. et al. Robust Aqua Material: A Pressure-Resistant Self-Assembled Membrane for Water Purification. *Angewandte Chemie International Edition* 56, 2203-2207 (2017).
35. Wang, N., Ji, S., Zhang, G., Li, J. & Wang, L. Self-assembly of graphene oxide and polyelectrolyte complex nanohybrid membranes for nanofiltration and pervaporation. *Chemical engineering journal* 213, 318-329 (2012).
36. Hegab, H. M., Wimalasiri, Y., Ginic-Markovic, M. & Zou, L. Improving the fouling resistance of brackish water membranes via surface modification with graphene oxide functionalized chitosan. *Desalination* 365, 99-107 (2015).
37. Agenson, K. O., Oh, J.-I. & Urase, T. Retention of a wide variety of organic pollutants by different nanofiltration/reverse osmosis membranes: controlling parameters of process. *Journal of Membrane Science* 225, 91-103 (2003).
38. Ahmad, A., Ooi, B., Mohammad, A. W. & Choudhury, J. Development of a highly hydrophilic nanofiltration membrane for desalination and water treatment. *Desalination* 168, 215-221 (2004).
39. Han, Y., Jiang, Y. & Gao, C. High-flux graphene oxide nanofiltration membrane intercalated by carbon nanotubes. *ACS applied materials & interfaces* 7, 8147-8155 (2015).
40. AlTaee, A. & Sharif, A. O. Alternative design to dual stage NF seawater desalination using high rejection brackish water membranes. *Desalination* 273, 391-397 (2011).
41. Han, Y., Xu, Z. & Gao, C. Ultrathin graphene nanofiltration membrane for water purification. *Advanced Functional Materials* 23, 3693-3700 (2013).

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

From the above description, one skilled in the art can easily ascertain the essential characteristics of the present technology, and without departing from the spirit and scope thereof, can make various changes and modifications of the technology to adapt it to various usages and conditions. Thus, other embodiments are also within the scope of the following claims.

What is claimed is:

1. A porous membrane comprising stacked layers of porous nanosheets and a plurality of nanodisks disposed between said layers of said porous nanosheets or between adjacent porous nanosheets,
   wherein each porous nanosheet consists of one to three atomic layers of a 2D material, the 2D material consisting of one or more transition metal dichalcogenides;
   wherein each porous nanosheet has a plurality of randomly distributed pores within the nanosheet, the plurality of pores having diameters in the range from about 10 nm to about 60 nm;
   wherein the porous nanosheets have diameters in the range from about 140 nm to about 1600 nm;
   wherein the nanodisks consist essentially of one to three atomic layers of a 2D material consisting essentially of one or more transition metal dichalcogenides;
   wherein the nanodisks have diameters in the range from about 10 to about 60 nm; and
   wherein the membrane comprises a network of water permeation pathways, the pathways comprising pathways through the nanosheets formed by the pores within the nanosheets, horizontal pathways formed by gaps between the layers, and vertical pathways formed by gaps between adjacent nanosheets and stacking defects between the layers.

2. The membrane of claim 1, wherein the one or more transition metal dichalcogenides are selected from the group consisting of $MoS_2$, $WS_2$, $MoSe_2$, $WSe_2$, $MoTe_2$, $WTe_2$, $NbS_2$, $ReS_2$, $NbSe_2$, $ReSe_2$, $NbTe_2$, $ReTe_2$, $NiS_2$, $NiSe_2$, $NiTe_2$, $ZrS_2$, $PdS_2$, $ZrSe_2$, $PdSe_2$, $ZrTe_2$, $PdTe_2$, $TaS_2$, $TaSe_2$, $TaTe_2$, $TiS_2$, $TiSe_2$, $TiTe_2$, $HfS_2$, $HfSe_2$, and $HfTe_2$.

3. The membrane of claim 1 having a thickness of 5 nm to 5 μm.

4. A porous membrane comprising stacked layers of porous nanosheets and a plurality of nanodisks disposed between said layers of said porous nanosheets or between adjacent porous nanosheets,
   wherein each porous nanosheet consists of (i) one to three atomic layers of a 2D material, the 2D material consisting of one or more transition metal dichalcogenides, and (ii) a plurality of amphipathic molecules adsorbed onto the nanosheets via hydrophobic interactions;
   wherein each porous nanosheet has a plurality of randomly distributed pores within the nanosheet, the plurality of pores having diameters in the range from about 10 nm to about 60 nm;
   wherein the porous nanosheets have diameters in the range from about 140 nm to about 1600 nm;
   wherein the nanodisks consist essentially of one to three atomic layers of a 2D material consisting essentially of one or more transition metal dichalcogenides;
   wherein the nanodisks have diameters in the range from about 10 to about 60 nm;
   wherein the membrane comprises a network of water permeation pathways, the pathways comprising pathways through the nanosheets formed by the pores within the nanosheets, horizontal pathways formed by gaps between the layers, and vertical pathways formed by gaps between adjacent nanosheets and stacking defects between the layers.

5. The membrane of claim 4, wherein the amphipathic molecules comprise a peptide having both charged and hydrophobic amino acids.

6. The membrane of claim 2, wherein the 2D material comprises $MoS_2$.

7. The membrane of claim 1 that has a water permeance of at least 200 $Lm^{-2}h^{-1}bar^{-1}$.

8. The membrane of claim 4 that has a rejection rate of charged or uncharged solutes of at least 99%.

9. A porous membrane comprising stacked layers of porous nanosheets and a plurality of nanodisks disposed between said layers of said porous nanosheets or between adjacent porous nanosheets,
   wherein each porous nanosheet consists of one to three atomic layers of a 2D material, the 2D material consisting of one or more transition metal dichalcogenides;
   wherein each porous nanosheet has a plurality of randomly distributed pores within the nanosheet, the plurality of pores having diameters less than about 10 nm;
   wherein the porous nanosheets have diameters in the range from about 140 nm to about 1600 nm;
   wherein the nanodisks consist essentially of one to three atomic layers of a 2D material consisting essentially of one or more transition metal dichalcogenides;
   wherein the nanodisks have diameters in the range from about 10 to about 60 nm; and
   wherein the membrane comprises a network of water permeation pathways, the pathways comprising pathways through the nanosheets formed by the pores within the nanosheets, horizontal pathways formed by gaps between the layers, and vertical pathways formed by gaps between adjacent nanosheets and stacking defects between the layers.

* * * * *